(12) United States Patent
Roberts et al.

(10) Patent No.: US 8,676,662 B1
(45) Date of Patent: Mar. 18, 2014

(54) SYSTEM AND METHOD FOR SELECTING A BEDDING MATTRESS

(71) Applicant: King Koil Licensing Company, Inc., Willowbrook, IL (US)

(72) Inventors: David J. Roberts, Tinley Park, IL (US); Ross Olinski, Bloomingdale, IL (US); Ken Swinarski, Darien, IL (US); Owen Shoemaker, Alpin, CA (US)

(73) Assignee: King Koil Licensing Company, Inc., Willowbrook, IL (US)

( * ) Notice: Subject to any disclaimer, the term of this patent is extended or adjusted under 35 U.S.C. 154(b) by 0 days.

(21) Appl. No.: 13/826,621

(22) Filed: Mar. 14, 2013

Related U.S. Application Data

(63) Continuation of application No. 13/410,664, filed on Mar. 2, 2012, now Pat. No. 8,458,042.

(60) Provisional application No. 61/448,339, filed on Mar. 2, 2011, provisional application No. 61/568,325, filed on Dec. 8, 2011.

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

| | | |
|---|---|---|
| 2,804,129 A | 8/1951 | Propst |
| 3,059,249 A | 10/1962 | Kamp |
| 4,667,357 A | 5/1987 | Fortune |
| 4,872,227 A | 10/1989 | Galumbeck |
| 4,895,352 A | 1/1990 | Stumpf |
| 5,136,740 A | 8/1992 | Kraft |
| 5,148,706 A | 9/1992 | Masuda et al. |
| 5,230,110 A | 7/1993 | Rose |
| 5,282,288 A | 2/1994 | Henson |
| 5,487,196 A | 1/1996 | Wilkinson et al. |
| 5,625,914 A | 5/1997 | Schwab |
| 5,745,940 A | 5/1998 | Roberts et al. |
| 5,794,288 A | 8/1998 | Soltani et al. |
| 5,806,046 A | 9/1998 | Curran et al. |

(Continued)

FOREIGN PATENT DOCUMENTS

| | | |
|---|---|---|
| DE | 4433773 | 3/1996 |
| EP | 0663169 | 7/1995 |

(Continued)

OTHER PUBLICATIONS

Unpublished U.S. Appl. No. 13/410,664, filed Mar. 2, 2012.

(Continued)

*Primary Examiner* — Mila Airapetian
(74) *Attorney, Agent, or Firm* — Barnes & Thornburg LLP

(57) ABSTRACT

A method is provided for selecting one of a plurality of different bedding mattresses for a customer. The method includes the steps of receiving a first set of data related to body characteristics of the customer and receiving a second set of data related to a dominant sleep position of the customer. The method further includes the steps of processing the first and second sets of data to evaluate support needs for a customer and determining which of the plurality of bedding mattresses has support characteristics that closely match the support needs of the customer.

17 Claims, 34 Drawing Sheets

(56) References Cited

U.S. PATENT DOCUMENTS

| | | | |
|---|---|---|---|
| 5,815,865 A | 10/1998 | Washburn et al. | |
| 5,970,789 A | 10/1999 | Meyer et al. | |
| 6,034,526 A | 3/2000 | Montant et al. | |
| 6,571,192 B1 | 5/2003 | Hinshaw et al. | |
| 6,585,328 B1 | 7/2003 | Oexman et al. | |
| 6,990,425 B2 | 1/2006 | Hinshaw et al. | |
| 7,467,058 B2 | 12/2008 | Boyd | |
| 7,484,282 B2 | 2/2009 | Flippin | |
| 7,631,381 B2 | 12/2009 | Flippin | |
| 8,341,784 B2 | 1/2013 | Scott et al. | |
| 8,341,786 B2 | 1/2013 | Oexman et al. | |
| 8,458,042 B1 | 6/2013 | Roberts et al. | |
| 2002/0124320 A1 | 9/2002 | Washburn et al. | |
| 2007/0017034 A1 | 1/2007 | Creekmuir | |
| 2007/0238935 A1* | 10/2007 | Boyd | 600/300 |
| 2008/0093784 A1 | 4/2008 | Rawls-Meehan | |
| 2010/0317930 A1 | 12/2010 | Oexman et al. | |
| 2010/0319136 A1 | 12/2010 | Scott et al. | |
| 2011/0004354 A1 | 1/2011 | Oxeman et al. | |
| 2011/0010014 A1 | 1/2011 | Oexman et al. | |
| 2011/0010249 A1 | 1/2011 | Oexman et al. | |
| 2011/0041592 A1 | 2/2011 | Schmoeller et al. | |
| 2011/0099722 A1 | 5/2011 | Moret et al. | |
| 2011/0291842 A1 | 12/2011 | Oexman et al. | |

FOREIGN PATENT DOCUMENTS

| | | |
|---|---|---|
| FR | 2720622 | 9/1996 |
| JP | H4-325116 | 11/1992 |
| WO | WO 9010204 | 9/1990 |
| WO | WO 2013/085785 | 6/2013 |

OTHER PUBLICATIONS

Litigation Search Report for U.S. Patent No. 6,585,328 dated Nov. 10, 2011 for Case U.S. Appl. No. 95/001,780.

* cited by examiner

Congratulations!
KSG
We found your

| Identity Number Information | |
|---|---|
| Name | KSG |
| Gender | Male |
| Sleep Position | None |
| Clothing size | Medium |
| Height | 5' 11" |
| ******** | ☐ |

EDIT

Are you sure you want to edit this information?

Cancel

We have searched our database and discovered your support size to determine the best fitting mattress for you

HOME PRINT EMAIL FAQ

Edit SleepID
Add partner
LEARN>>> more

<<<BACK

*FIG. 5G1*

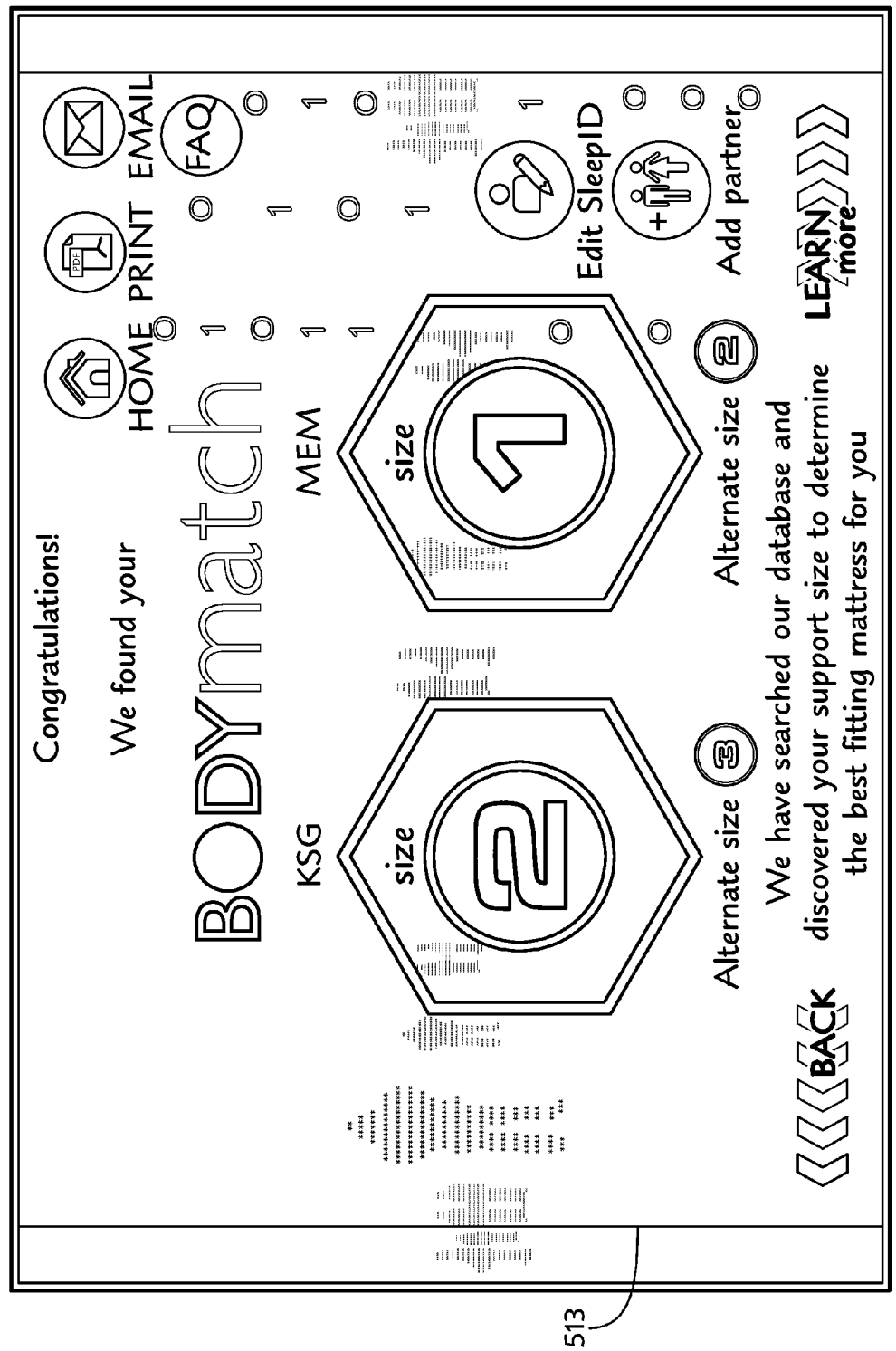
FIG. 5G2

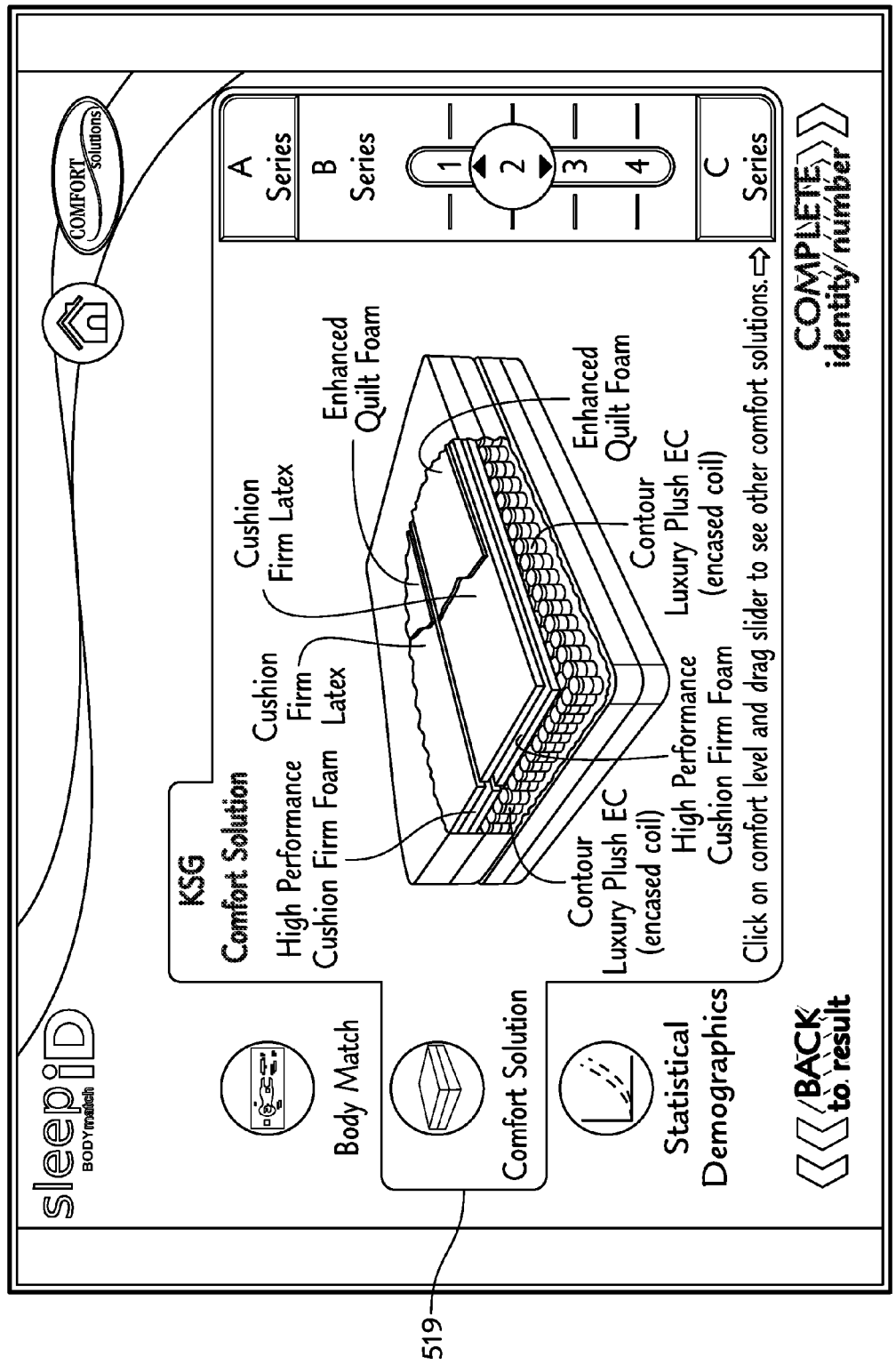
FIG. 5J1

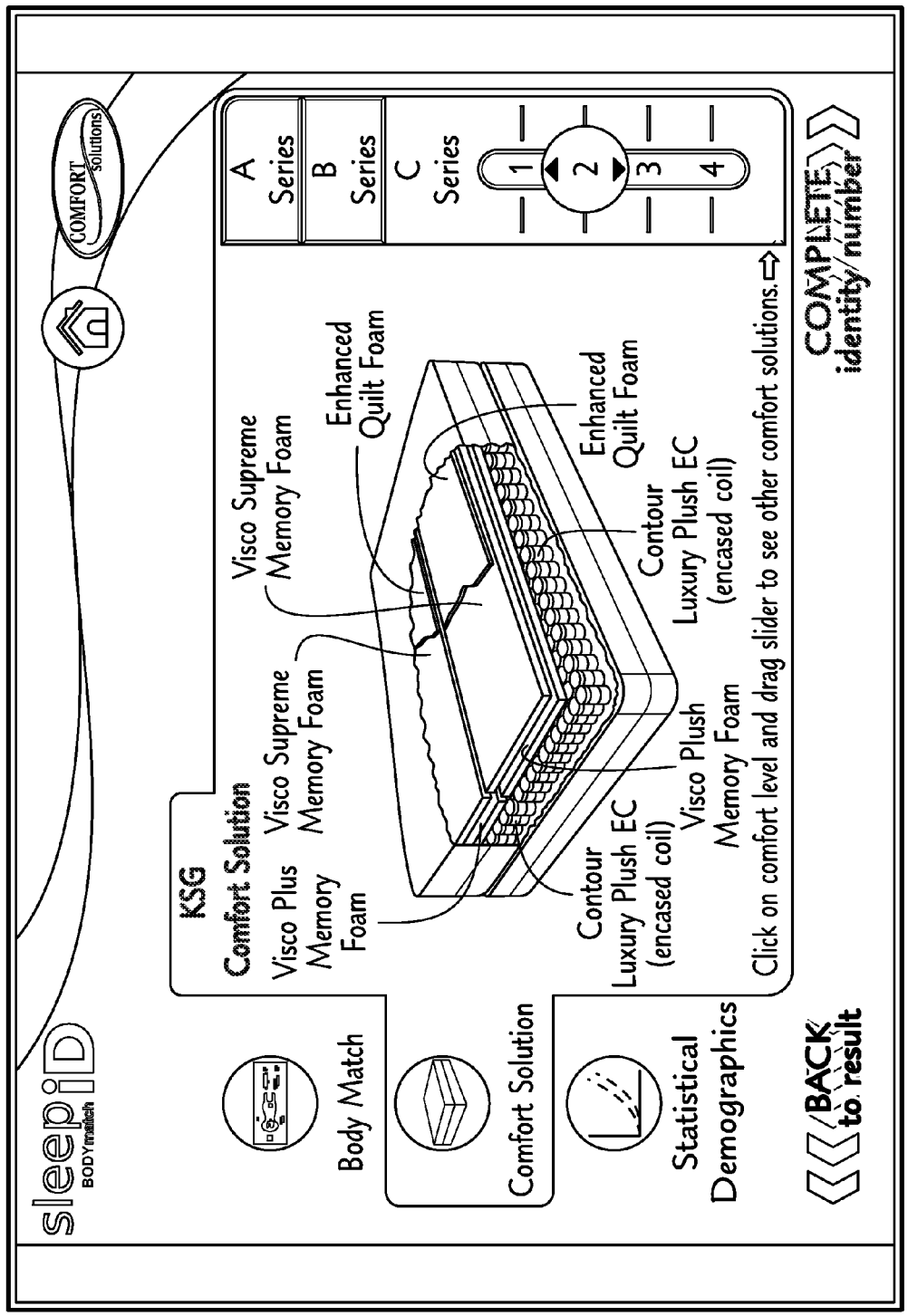
FIG. 5J2 sleepiD BODYmatch

10% OFF Bonus Savings Survey your email address* why "retailer" visit today
- Living Room
- Bedroom
- OTHER age of current mattress ange most important to my choice postal Code please rate your Sleep ID experience how did you hear about us Submit    Reset

568

Once you click submit, a 10% coupon will be emailed to your address. Please bring this coupon with when you visit a "enter retail name" location.

If you are at a "enter retail name" location, the Sleep Expert will provide you a printed coupon at the time of purchase.

Thank You!

<<< BACK

SYSTEM AND METHOD FOR SELECTING A BEDDING MATTRESS

CROSS-REFERENCE

This application is a continuation-in-part of U.S. patent application Ser. No. 13/410,664, filed Mar. 2, 2012, and entitled "Methods for Selecting a Bedding Mattress," which claims the priority of U.S. Provisional Patent Application Ser. No. 61/448,339, filed on Mar. 2, 2011, and entitled "System and Methods for Selecting a Bedding Mattress" and U.S. Provisional Patent Application Ser. No. 61/568,325, filed on Dec. 8, 2011, and entitled "System and Method for Selecting a Bedding Mattress." The disclosures of such applications are incorporated by reference herein in their entireties.

TECHNICAL FIELD

This invention relates generally to bedding mattresses. More particularly, the present invention relates to a system and method for assisting a customer in selecting a bedding mattress based on his/her body characteristics and sleeping preferences.

BACKGROUND OF THE INVENTION

A comfortable and restful sleep can significantly affect a person's health and mood. However, most mattresses available for sale at local bedding establishments or via the Internet are not suitable for providing the comfort and support conducive for the desired sleep. This is because most mattresses are not tailored to take into account the physical characteristics of the users and the different load or pressure points caused by their sleeping positions.

Some mattress manufacturers have attempted to provide mattress designs that take into account desired support levels and pressure points. One such mattress design disclosed in U.S. Pat. No. 7,467,058 B2, to Dennis M. Boyd, and issued on December 2008, is provided via a method and system for selecting a mattress. This method and system is provided for diagnosing a subject's desired level of support and comfort. In accordance with the method, a diagnostic mattress with an adjustable support structure is provided. A subject is positioned on the diagnostic mattress. The adjustable support structure of the diagnostic mattress is adjusted in accordance with a desired level of support as determined by positioning the subject on the diagnostic mattress. The subject's desired support level is correlated to a support characteristic of a mattress with a fixed support structure thereby allowing the subject to select a mattress with a fixed support structure characteristic generally equal to the subject's desired support level as determined from the diagnostic mattress. A system employing this method is also disclosed. U.S. Pat. No. 7,467,058 B2 is incorporated herein by reference for at least the purpose of giving context to the present invention.

Another system for providing customized mattresses is described in U.S. Patent Publication No. 6,990,425 B2 to W. Eric Hinshaw, which is directed to an automatic mattress selection system. A person shopping for a mattress is helped to select a physiologically suitable mattress by a system which uses a questionnaire to elicit important information from the person and a test bed to derive weight distribution information of the person. The answers to the questionnaire combined with the bed test results are processed automatically to generate a recommendation of which available mattress system is most suitable for the person. U.S. Pat. No. 6,990,425 B2 is incorporated herein by reference for at least the purpose of giving context to the present invention.

However, the prior systems and methods require that the customer or user lie on a test bed to determine a suitable mattress. Therefore, there exists a need for a system and method for enabling a customer to select a bedding mattress without being required to lie on a test bed.

SUMMARY OF THE INVENTION

The present invention is defined by the appended claims. This description summarizes some aspects of the present embodiments and should not be used to limit the claims.

A system, method, and articles of manufacture are discussed consistent with the present invention, which assist a customer in selecting a bedding mattress based on body characteristics and sleeping preferences of the customer, without laying on a test bed.

One embodiment of the present invention is directed to a method for selecting one of a plurality of different bedding mattresses for a customer. The method includes the steps of receiving a first set of data related to body characteristics of the customer and a second set of data related to a dominant sleep position of the customer. The method further includes the steps of processing by a processor the first and second sets of data to evaluate support needs for a customer and determining by the processor which of the plurality of bedding mattresses has support characteristics that closely match the support needs of the customer.

A further embodiment of the present invention is directed to a method for selecting one of a plurality of different bedding mattresses for a customer. The method includes the steps of receiving a first set of data related to body characteristics of the customer and a second set of data related to a temperature of the customer during sleep. The method further includes the step of processing by a processor the first and second sets of data to evaluate support needs of the customer and determining which of the plurality of bedding mattresses has support characteristics that closely match the support needs of the customer.

In another embodiment of the present invention, a method is provided for selecting one of a plurality of different bedding mattresses for a customer. The method includes the steps of receiving a first set of data related to body characteristics of the customer, a second set of data related to available mattresses, a third set of data related to sleep profile information stored in a database, and a fourth set of data related to a dominant sleep position of the customer. The method further includes the steps of processing by a processor the first, second, third, and fourth sets of data to evaluate support needs of the customer and determining by the processor which of the plurality of bedding mattresses has support characteristics that closely match the support needs of the customer.

Another embodiment of the present invention is directed to a computer readable storage medium encoded with a computer program application configured to select one of a plurality of different bedding mattresses for a customer.

Another embodiment of the present invention is directed to a system for assisting a customer in selecting one of a plurality of different bedding mattresses, which comprises a wireless mobile personal computer, a desktop personal computer, and a vendor computer, all connected to a server computer via a wireless network and/or a wired network.

Other systems, methods, articles of manufacture, features, and advantages of the present invention will be, or will become, apparent to one having ordinary skill in the art upon examination of the following drawings and detailed description. It is intended that all such additional systems, methods, articles of manufacture, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

Figure 1:
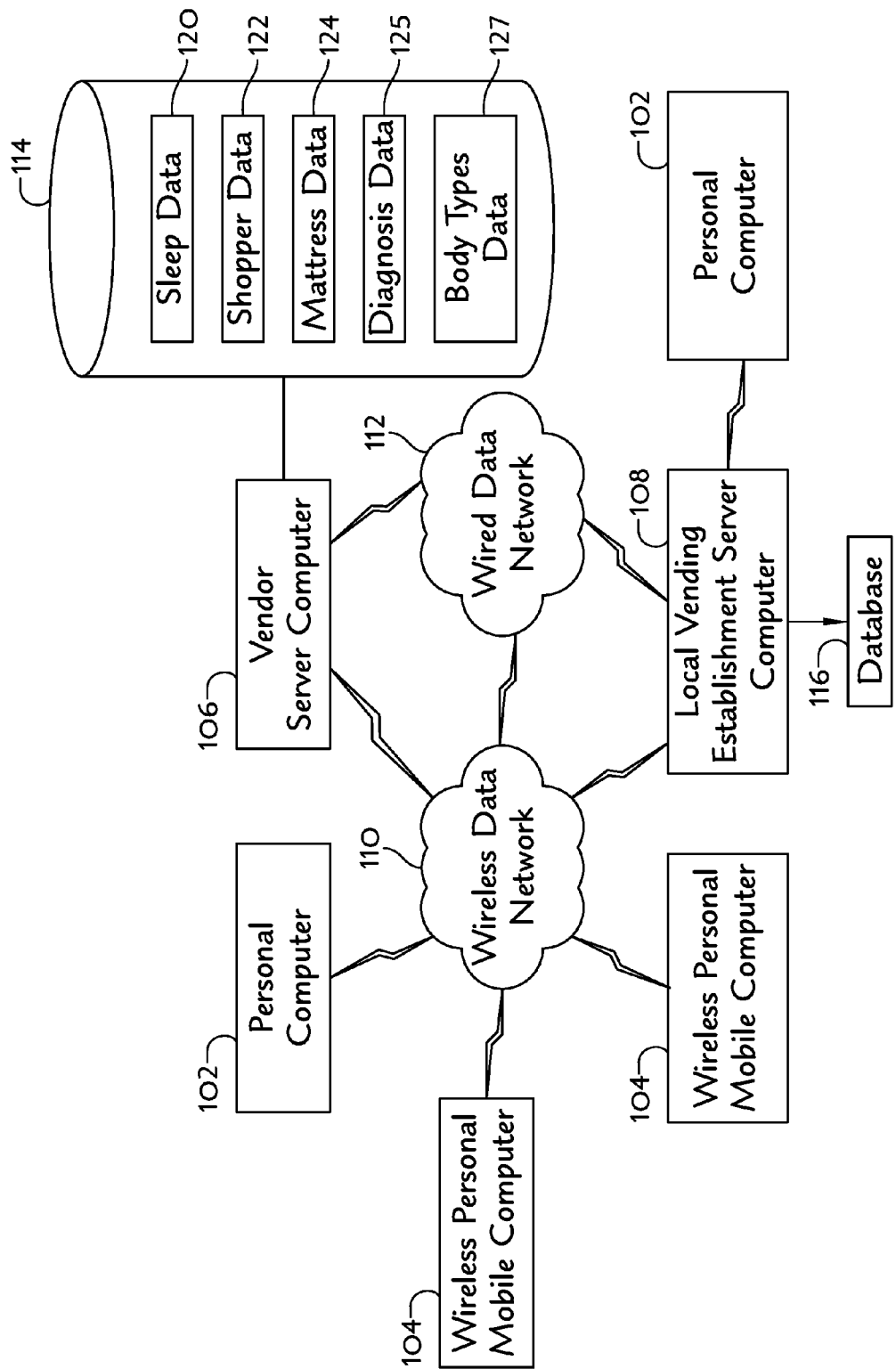
FIG. 1 is a system diagram illustrating an embodiment of a computer networked system in accordance with the invention.

Illustrative and exemplary embodiments of the invention are described in further detail below with reference to and in conjunction with the figures.

DETAILED DESCRIPTION OF THE INVENTION

The present invention is defined by the appended claims. This description summarizes some aspects of the present embodiments and should not be used to limit the claims.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

To provide a restful sleeping condition to a user or customer, a mattress should provide substantial support and comfort tailored to the physical or body characteristics and sleeping positions or preferences of the user, which together are also referred to as a first set of data. The physical characteristics can include gender, age, height, weight, weight distribution, body shape, top and bottom clothing sizes, which correlate to body shapes, and so forth. The sleeping positions include dominant sleeping positions, such as back side and stomach positions, but may include other positions without departing from the teachings herein. The body shape may be entered by allowing the user to select a graphical depiction of available body shapes, such as tall and thin, short and heavy, athletic build, pear-shaped, proportional, petite, top heavy or bottom heavy, or by allowing a user to choose one of a number available selections similar to the foregoing list.

To collect data for use in determining pressure points that are attributable to various body types, various diagnostic systems and analysis may be applied. For example, the data may be generated by having physical examinations of sleepers, which includes identifying and recording a sleeper's body size, pressure points, problem areas and sleep references. To assist with identifying pressure points, x-rays, mattresses with pressure sensor pads on top, and other means for measuring spine curvature and body shape may be employed. For example, in one embodiment, one or more images, such as x-rays, magnetic resonance imaging (MRI) images, pictures, videos, and/or combinations of inputs, may be utilized to collect and input data regarding a particular sleeper, as will be discussed in greater detail below. Data related to images taken of a customer may also be referred to as a fourth set of data.

Using pressure sensor pads in combination with mattresses or support structures, also known as test beds, to measure pressure points for sleepers is well known in the industry. The test beds may be configured to detect body or weight pressures produced by the resting bodies in different areas of the test bed. The detected pressures may be converted to signals, which are communicated as inputs to an evaluation system 10. The evaluation system 10 may include a processing unit, such as a server or a personal computer. The input signals may be processed with instructions of a program that is executed by the processing unit and analyzed to evaluate and determine weight distributions on the test mattresses. To test how specific beds support different individuals, the input signals may also identify locations of pressure points for different sleeping positions for each of the body types.

Based on the physical characteristics provided by the customer or other input and entered, the evaluation system may generate a pre-defined number of mattress support sizes for individual comfort, in this example—four different sizes. Although only four support sizes will be discussed herein, any other desirable number of support sizes may be devised to reflect a corresponding number of population body type ranges. The first support size, hereafter referred to as Size 1, corresponds to a mattress design that is most suited to bodies that might purchase clothing in the petite and small sizes. Support size 1 can also be applied to customers that may be rather tall and thin. The second support size, hereafter referred to as Size 2, corresponds to a mattress design that is most suited to bodies that might purchase clothing in the medium sizes. The third support size, hereafter referred to as Size 3, corresponds to a mattress design that is most suited to bodies that might purchase clothing in the large sizes. Sizes 2 and 3 are the most common, as they make up the largest group of people. The fourth support size range, hereafter referred to as Size 4, corresponds to a mattress design that is most suited to bodies that might purchase clothing in the extra large and extra, extra large sizes. As will be discussed further below, when the process assigns a support size to a customer, based on body and sleeping preference information or data provided by the customer in response to corresponding questions or based on another input, an alternate support size option might also be suggested for consideration in the mattress selection that will be either "down the scale" toward a lower support size or "up the scale" toward an upper support size depending on factors, such as how close the customer is to the median point of the assigned support size and whether the customer is a side sleeper, a back sleeper or a stomach sleeper.

As stated above, the system 100 may include sleep data 120 related to body height, weight, shape, and pressure points or any other data relating to individuals and may determine support needs. The sleep data 120 is generated separate and apart from prospective customers at point of sale sites. The sleep data 120 may be combined with additional shopper data 122 that the customer or shopper may enter, such as preferred mattress attributes (e.g., firm), pain issues, and comfort concerns or data collected from images uploaded or taken by the system, as discussed in greater detail below. For assisting shoppers with mattress selections, the system 100 may correlate the shopper data 122 and the sleep data 120 to data related to the available mattresses, hereafter referred to as mattress data 124 or a second set of data, thereby generating a support size that matches the consumer's body to one of the four support sizes, which may further correlate to a specific bed or mattress type. As stated earlier, a first option support size and an alternate option support size may be recommended to a shopper for trial, and the customer may also customize the desired mattress with different support levels for each sleeping side of the mattress. Thus, the objective of the evaluation system is to deliver minimal pressure and maximum support to disparate body types. Matching body types to mattresses with proper body support assists with delivering proper posture alignment, ideal support factors and a comfort balance for pressure points.

Although a mattress may be custom-built for each shopper, only a small number of different mattresses, each of which covering a range of population body type characteristics, may realistically be made available at local vending establishments. Each of the small number of different mattresses may be recommended to the shopper based on the closest fit of the shopper's characteristics to the support characteristics associated with a particular mattress. The materials, used in the manufacturing of each of the mattresses, are evaluated for comfort, support, and pressure point relief. As an example, the mattress type, that matches the support level suitable for support size 3, may use firmer coil spring elements and stronger upholstery foams than the support proposed for support sizes 1 and 2. For support size 4, the suitable mattress type may include a more supportive spring system and foam layers configured for high density and durable comfort. Because of the very different comfort requirements between a support size 4 and a support size 2, when a support size 4 customer shares a bed with a support size 2 customer, the support size is only adequate to one of them. For example, a split bedding arrangement or structure may be suggested, that is half of the bedding should be a mattress type configured for support size 4 and the other half of the bedding should be configured for support size 2.

Referring now to FIG. 1, a system diagram illustrates an embodiment of a computer networked system 100 for enabling a selection of a bedding mattress by a customer based on physical characteristics and sleeping preferences of the customer. The computer networked system 100 may include a plurality of personal computers 102, a plurality of wireless mobile personal computers 104, a vendor computer 106, a server computer 108, a wired data network 110 and a wireless data network 112. The wired data network 110 can be a global network, a wide area network or a local area network. The wireless data network 112, which may be coupled to the wired data network 112, may include one of more wireless data networks, such as cellular networks, WiFi networks, Bluetooth networks, etc. The vendor computer 106 and the server computer 108 may be coupled to both the wired data network 110 and the wireless data network 112. The personal computers 102 may couple to the wired data network 120 over wired connections and to the wireless data network 112 over wireless links. In this regard, the personal computers 102 may access the vendor computer 106 and/or the server computer 108 through the wired data network 110 and/or the wireless data network 112. The wireless mobile personal computers 104 may couple to the wireless data network 112 over wireless links to access the vendor computer 106 and/or the server computer 108. The vendor computer 106 and the server computer 108 are each coupled to a database 114 and 116, respectively, for storing, at least, body type profiles and information about mattress structures and mattress materials and their properties. This data is also referred to as sleep profile information or a third set of data. In one embodiment, the wired data network 112 and the wireless data network 110 are connected to the World Wide Web (WWW, hereafter referred to as Web) and the Internet. The wireless personal computer 104 is preferably a handheld digital device of palm size or smaller, and can be a personal digital assistant (PDA), a cellular phone, a hybrid between a cellular phone and a PDA, a smart phone such as an iPhone (3G, 3GS or other versions), a tablet, or any other handheld electronic device having a display screen.

Figure 2:
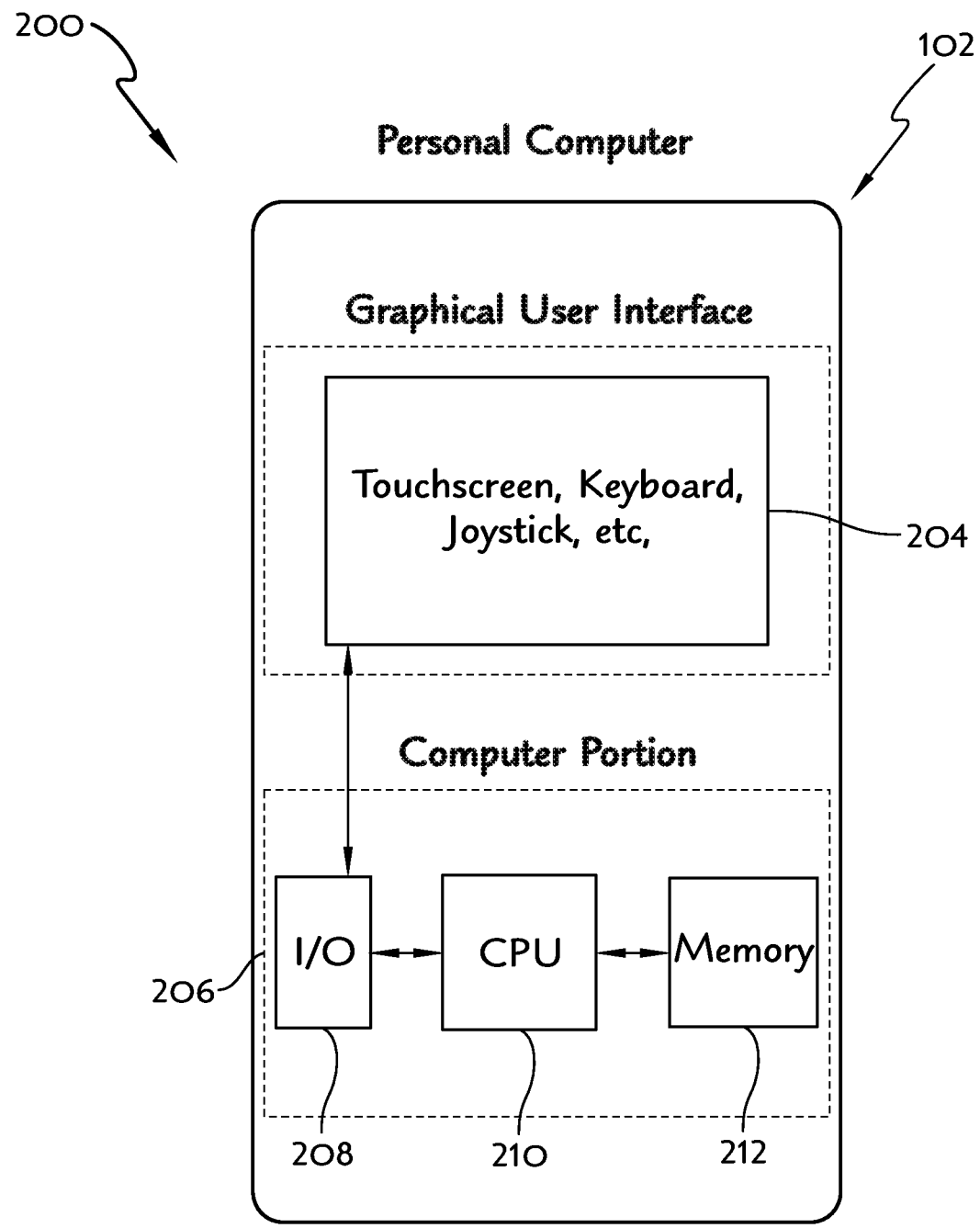
FIG. 2 is a schematic diagram of a personal computer.

Now referring to FIG. 2, a diagram 200 illustrates schematically one of the personal computers 102 of FIG. 1. The personal computer 102 includes a graphical user interface 204 and a computer portion 206. The graphical user interface 204 may include one or more input/output (I/O) devices 208, such as a touch screen, a keyboard, a stylus, a joystick, and the like, which can be arranged in various manners and have different shapes or designs without changing the spirit of the interaction of the graphical user interface 204 with the I/O device 208. The touch screen can be a liquid display crystal (LCD), display screen, a plasma screen, a light emitting diode (LED), or any other screen capable of displaying text and images. The computer portion 206 may include the I/O device 208, a central processing unit (CPU) 210, i.e., a microprocessor, and memory 212. The CPU 210 can be any computer-processing unit, including multi-processor or single processor configurations. The memory 212 can include, without limitation, any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 212 may incorporate electronic, magnetic, optical, and/or other types of storage media, and may have a distributed architecture where various components are situated remote from one another, but are still accessed by CPU 210, such as cloud computing. The graphical user interface 204 is coupled to the I/O device 208 such that a command or data entered by a user or customer through the graphical user interface 204 will be forwarded to the I/O device 208, to the CPU 210 and then to memory 212.

Figure 3:
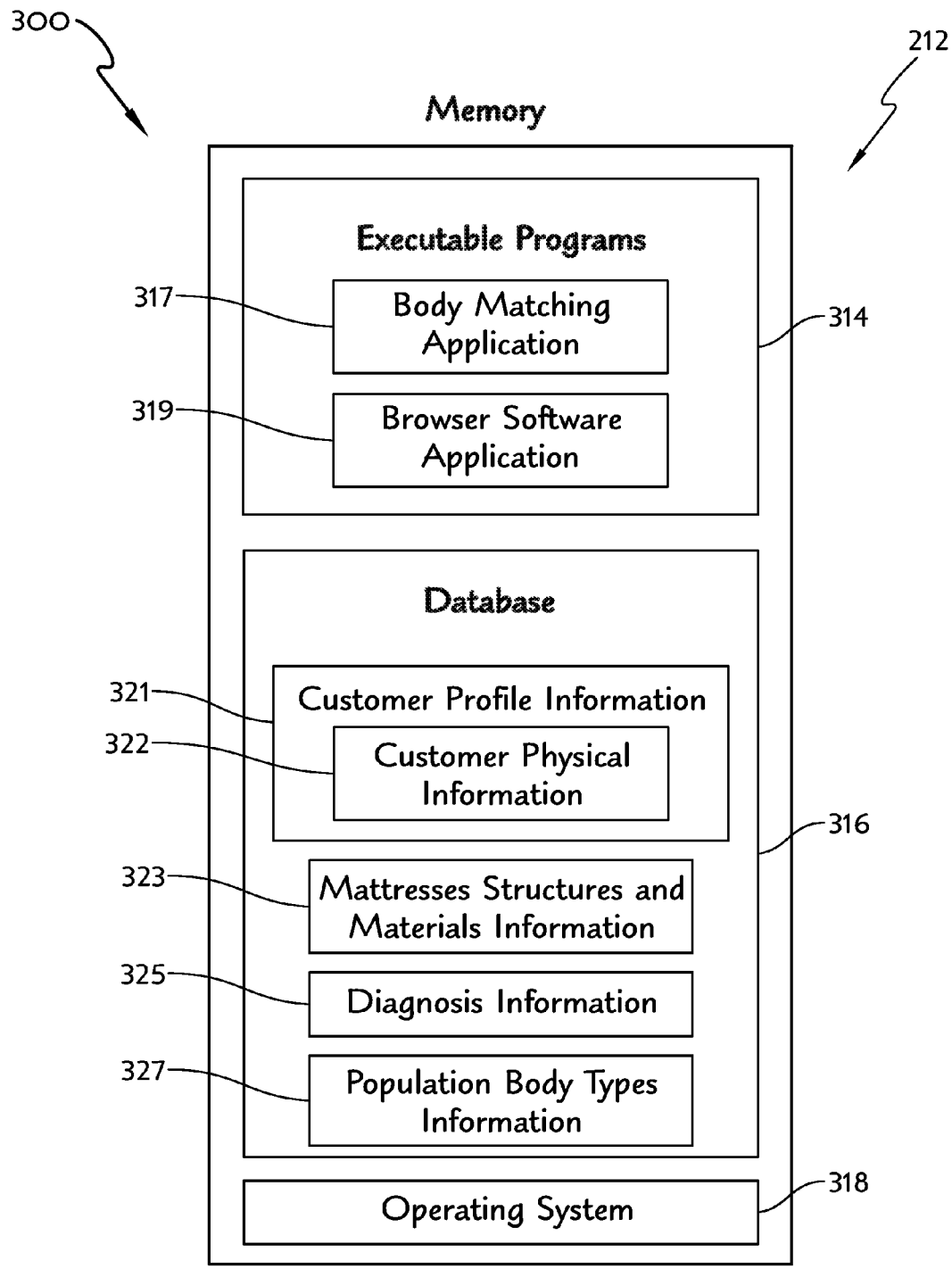
FIG. 3 is a schematic diagram of a memory portion of the computer server of FIG. 2.

A schematic diagram 300 of the memory 212 shown in FIG. 2 is depicted in FIG. 3. The memory 212 may include or store executable programs 314, a database 316, and an operating system 318. The executable programs 314 may include a body matching code segment or application 317, and a touch screen browser software application 319, each stored within the memory 212 or other computer hardware device, for operation in connection with the CPU 210 or other hardware device. The executable programs 314 may be implemented in software, firmware, hardware, or a combination thereof. The database 316 may store data related to customer profiles 321, which may include customer physical information 322, and related to mattress structure and materials information 323. The stored customer physical information 322 may include height, weight, weight distribution, body shape of the customer, spine curvature of the customer, and any other physical information that may be utilized in selecting a mattress for the customer.

The operating system 318 essentially controls the execution of other computer programs, such as the body matching application 317, and may provide scheduling, input/output control, file and data management, memory management, and communication control and related services.

The body matching application 317 and the operating system 318, in whole or in part, but typically the latter, may be read by the CPU 210, and/or buffered within the CPU 210, and then executed. When the mattress selecting application 320 is implemented in software, it may be stored on any computer readable medium for use by or in connection with any computer related system or method. In the context of this document, a computer readable medium is an electronic, magnetic, optical, or other physical device or means that may contain or store a computer program for use by or in connection with a computer related system or method. The body matching application 317 may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" can be any means that may store, communicate, propagate, or transport the program for use by or in connection with the instruction execution system, apparatus, or device. The computer readable medium may be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), and a portable USB storage device. Note that the computer-readable medium could even be paper or another suitable medium upon which the program is printed, as the program may be electronically captured, via, for instance, optical scanning of the paper or other medium, then compiled, interpreted or otherwise processed in a suitable manner if necessary, and then stored in a computer memory. In another embodiment, where the mattress selection application 320 is implemented in hardware, it should be obvious that it may also be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As discussed above, each one of personal computers 102 and the wireless mobile personal computers 104 may include a graphical user interface 204. In one embodiment, the graphical user interface 204 may be provided for displaying a plurality of body identifying or matching interface screens 500 consistent with the present invention and receiving customer selections, via cursor clicks, in response thereto, as will be described in greater detail below. In another embodiment, the graphical user interface 204 may also instruct a user to import or otherwise take an image (e.g., x-ray, MRI image, picture, video, or other image) of the body of a person and input it into the system. In the embodiment shown in FIG. 2, the CPU portion 210 at least in part generates, launches, communicates, and/or implements the body matching interface screens 500 to display the body matching interface screens 500 on the graphical user interface 204.

Figure 4:
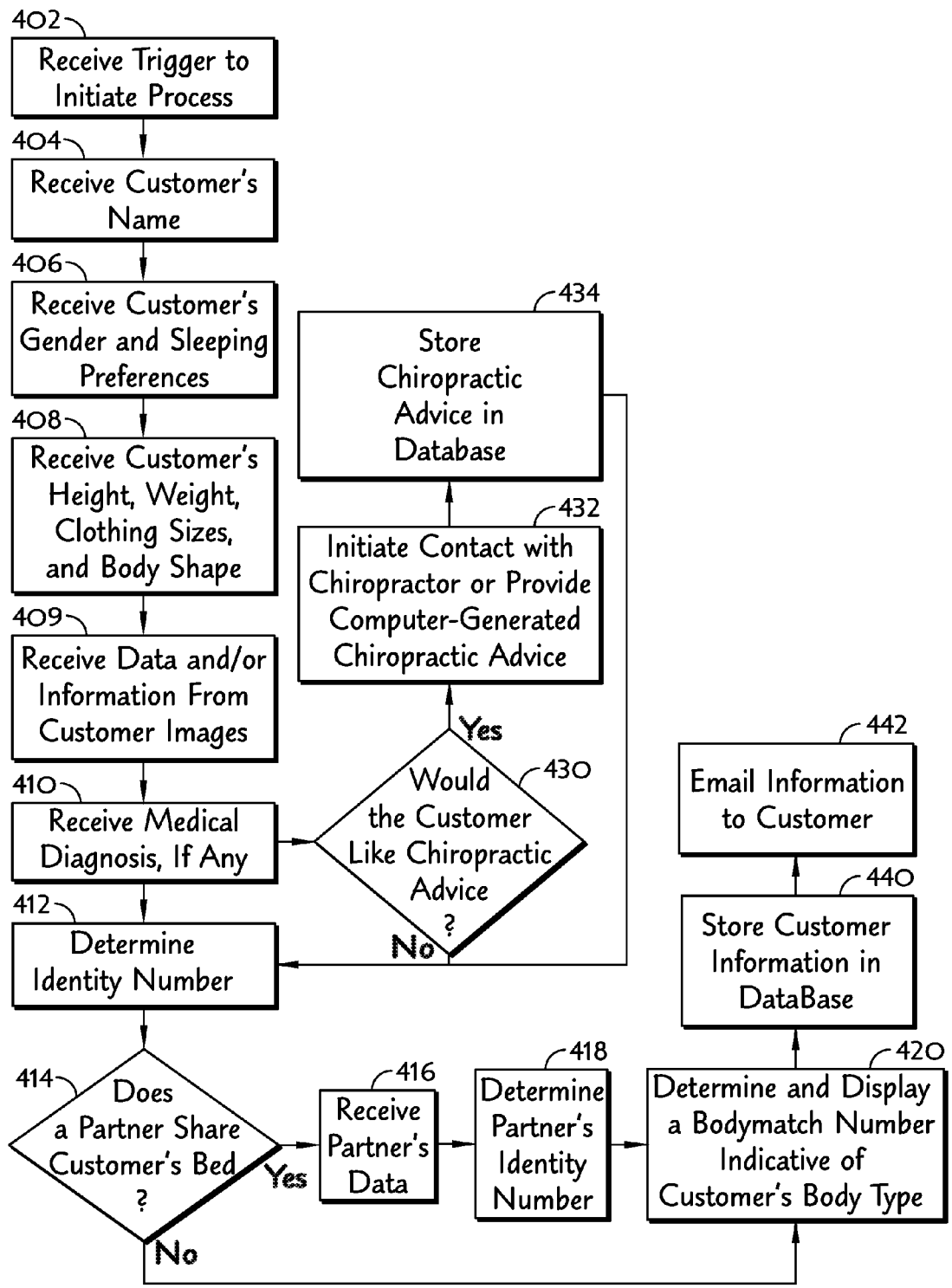
FIG. 4 is a flow chart illustrating an embodiment of a process for selecting a bedding mattress in accordance with the invention.
Figure 5A:
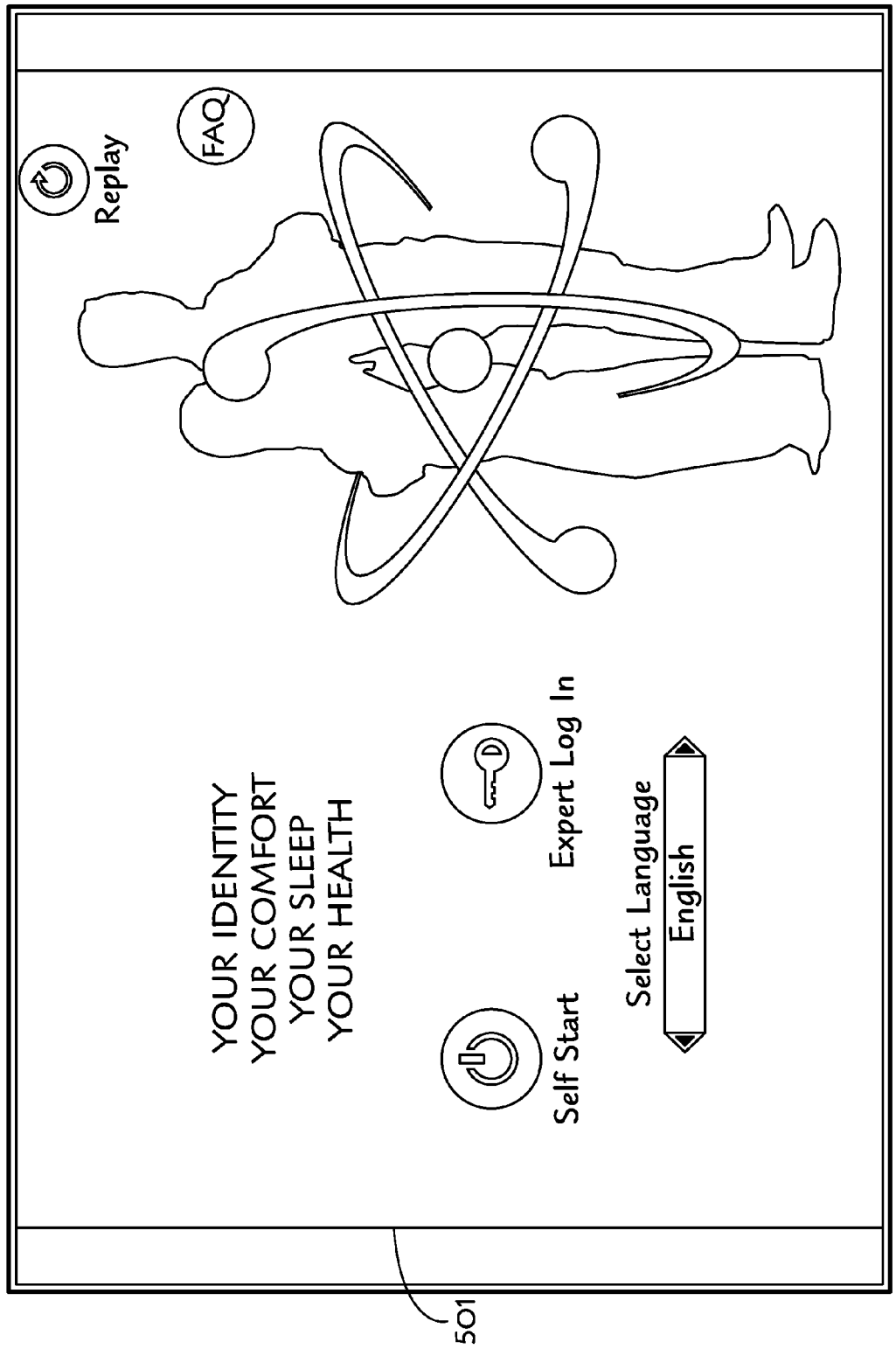
FIGS. 5A-5O illustrate customer interface screens displayed on a computer screen and representing a mattress selection process in accordance with the invention.

Although, the customer may access the vendor's website using the Internet via a computer running a web browser program, for the sake of simplicity, we assume that the customer has access to the personal computer 102, located at a local retail establishment, on which resides the body matching application 317. As such, the customer may view the body matching interface screens 500 as displayed on the graphical user interface 204 by launching the body matching application 317, and the customer may utilize these body matching interface screens 500 to enter requested data. Referring to FIG. 4 and FIGS. 5A-5O, body matching interface screens 500 are displayed on the graphical user interface 204 of the personal computer 102. In one embodiment, the body matching application 317 may be configured to generate and display an opening customer body matching interface screen 501, at Step 402, which allows the customer to begin the process of providing personal data, such as body type, height, weight, body shape or size, and dominant sleep position, in order to generate a support size or identity number 570 and which assist a user in matching their bedding comfort and support needs to one of a plurality of the available mattresses.

Figure 5B:
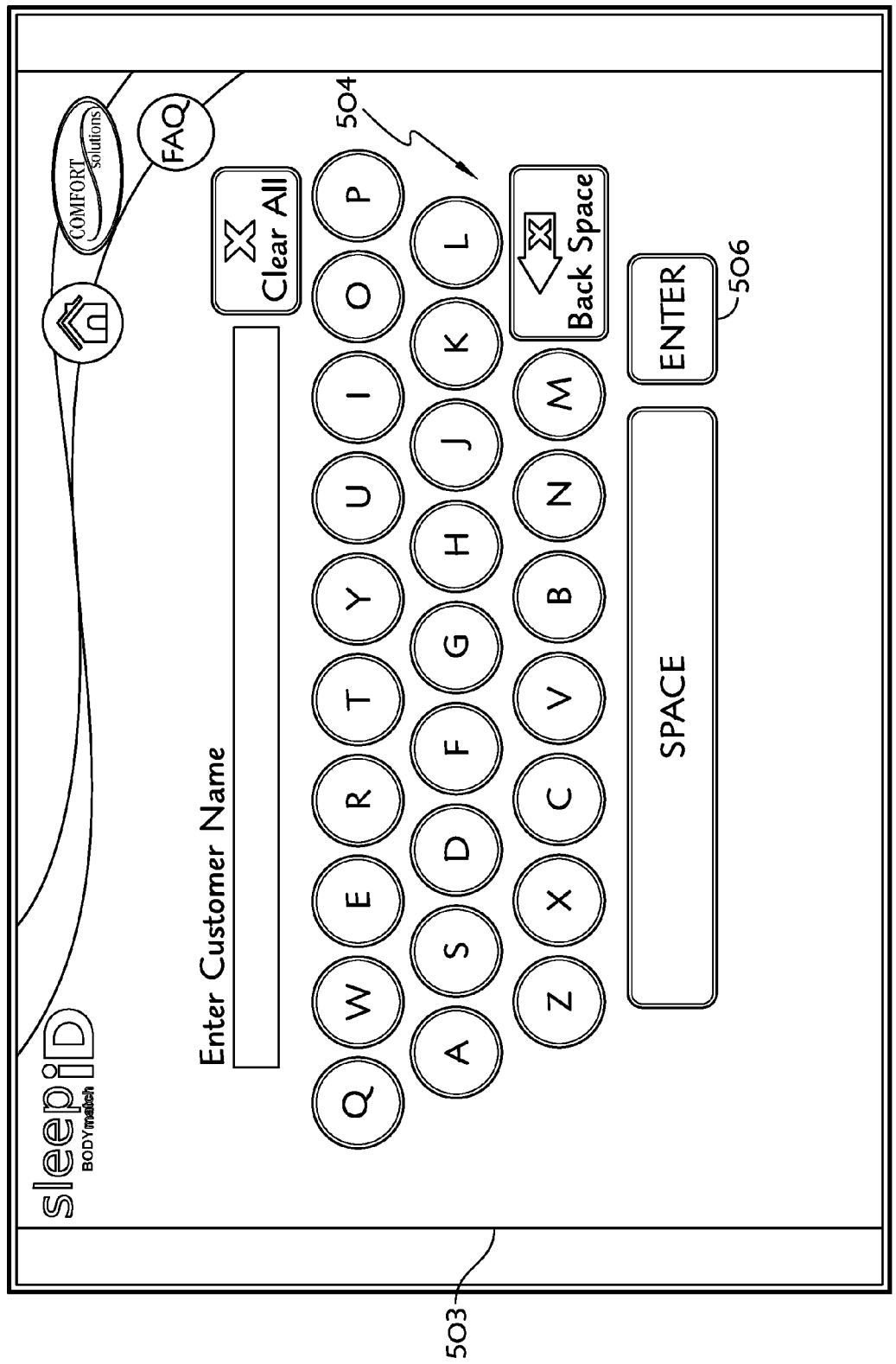

Referring to FIG. 5B, upon detection by the body matching application 317 that the "self start" icon 502, which is displayed in body matching interface screen 501, has been selected, the body matching application 317 generates and transmits for display another interface screen 503, which may include a virtual keyboard 504 for entering the customer name. Once the customer enters his/her name by selecting corresponding letters via a cursor on the virtual keyboard 504, at Step 404, the customer can select the "ENTER" icon 506 to proceed.

Figure 5C:
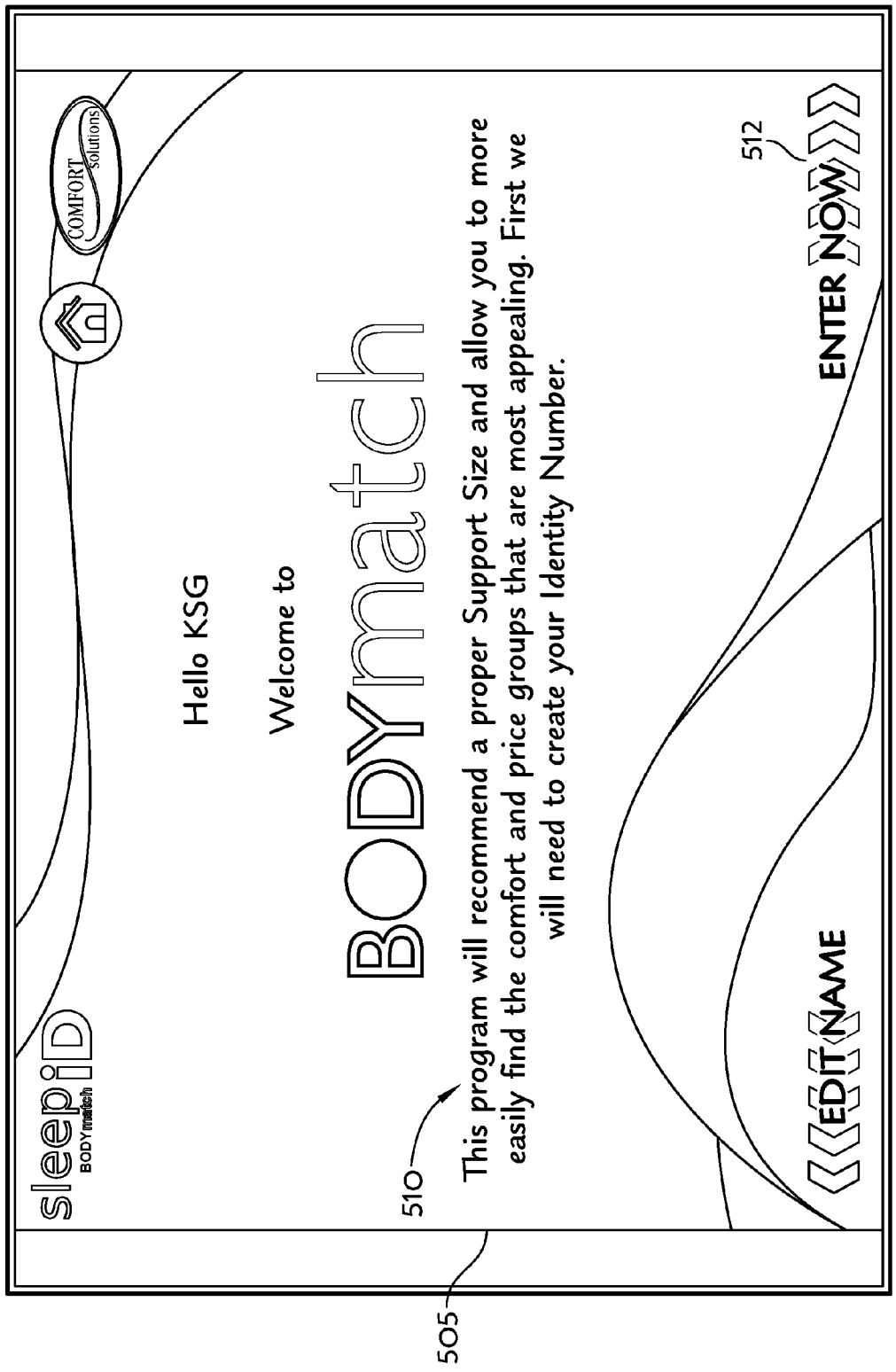

Upon detection by the body matching application 317 that a name was typed in and that the "ENTER" icon 506 has been selected, a welcome interface screen 505, shown in FIG. 5C, will be transmitted to and displayed on the graphical user interface 204. The welcome interface screen 505 includes a message 510 welcoming the customer to the "bodymatch" program, and indicating that this program is configured to recommend a proper support size and to allow the customer to more easily find the comfort and price mattress groups that are most desirable or appealing to the customer. In order to recommend the proper support size, an associated "Identity Number" 572 needs to be created for the customer based on entries provided by the customer responsive to questions generated by the body matching application 317.

Figure 5D:
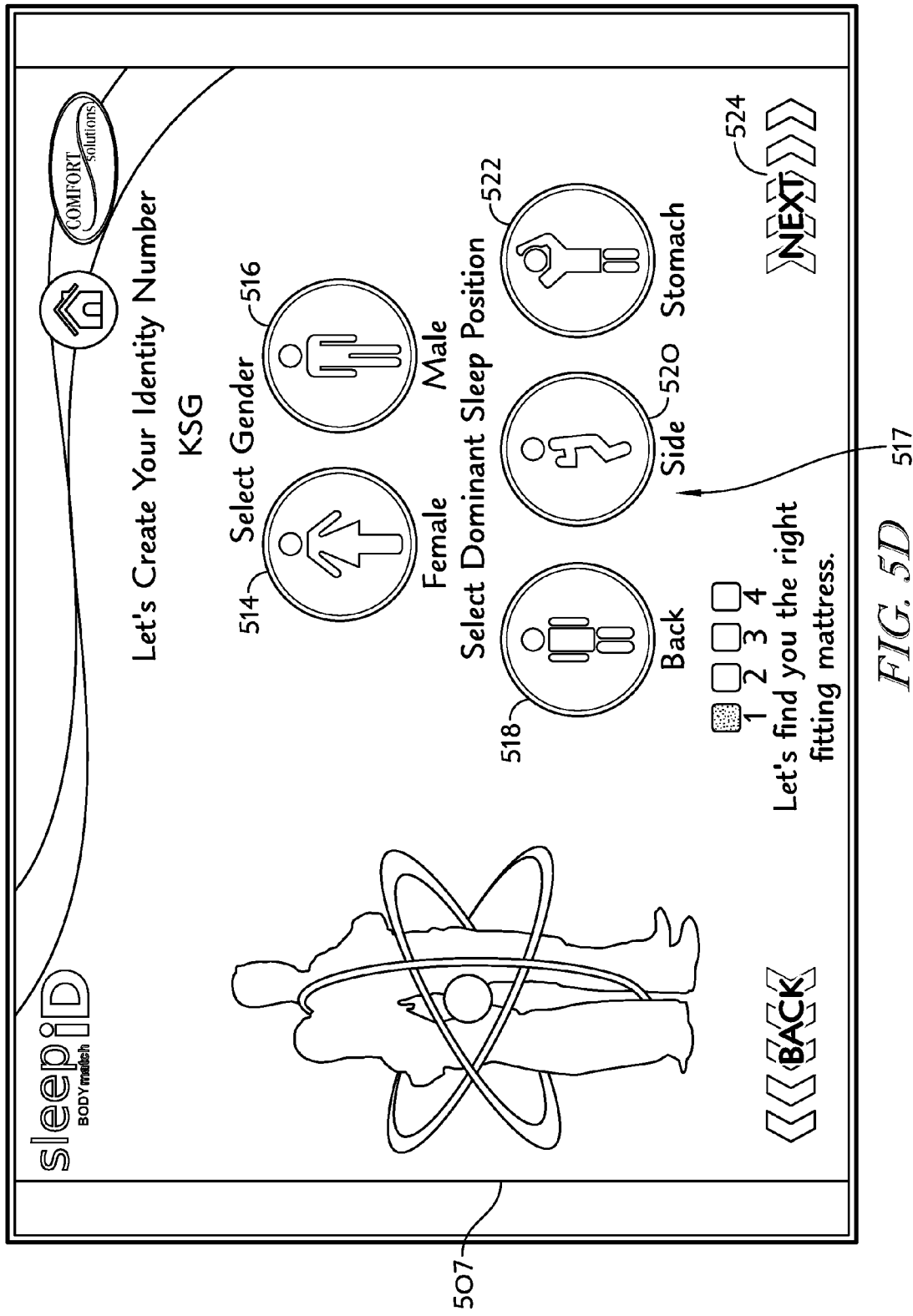
Figure 5E:
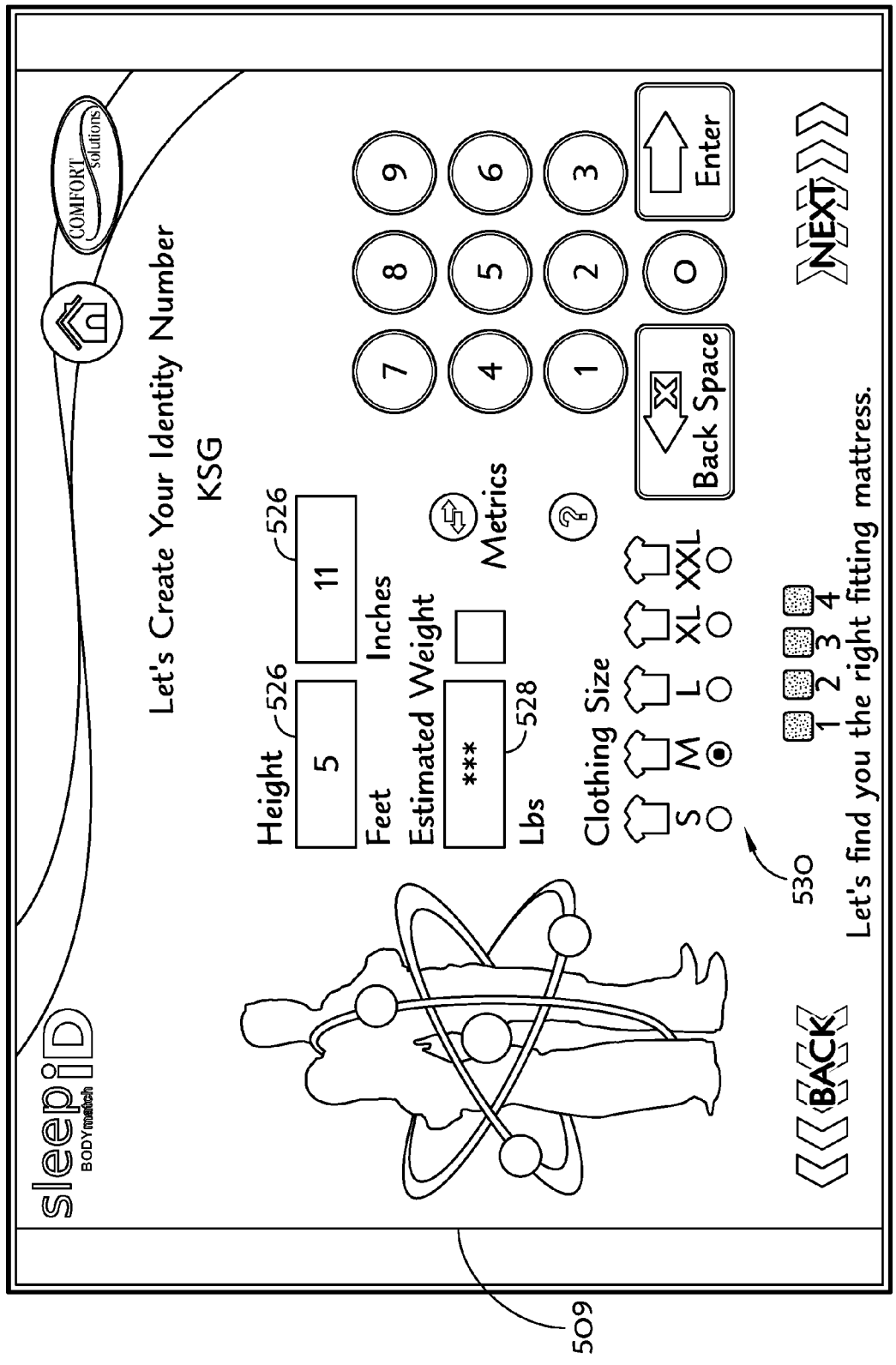

Upon detection of the selection of the "Enter Now" icon 512, the body matching application 317 is configured to generate and display another interface screen 507, as seen in FIG. 5D, which includes gender buttons 514 and 516, and dominant sleep position buttons 517, which correspond to a back sleep position 518, a side sleep position 520 and a stomach sleep position 522, respectively, at Step 406. After one of the gender buttons 514 and 516, and one of the dominant sleep position buttons 518, 520, 522, and the "NEXT" icon 524 has been selected, the body matching application 317 may be configured to generate and display an identity number interface screen 509, shown in FIG. 5E, which allows the customer to enter his/her height, estimated body weight in boxes 526 and 528, respectively. The identity number interface screen 509 also provides a selection between a plurality of icons 530, representing a plurality of clothing sizes, such as petite (P) and/or small (S), medium (M), large (L), extra large (XL), and extra extra large (XXL), respectively.

Once the height and the body weight have been entered and one of the clothing sizes has been selected, at Step 408, the body matching application 317 may be configured to generate and display another interface screen, which allows the input of an image of a customer at optional Step 409. In particular, the image may include data and information related to the curvature of a customer's spine, the specific shape and proportions of the customer's body or areas of the customer's body, the bone structure and shape of the customer, and/or any other relevant data or information that can be collected by way of an image and used to determine the suitability of a particular mattress for the customer. Examples of images include, but are not limited to, x-rays, MRI images, pictures, videos, or any other images or scans. A camera, video camera, x-ray machine, MRI machine, or any other apparatus for taking an image or scan may be connected to the personal computer 102 for immediate imaging and uploading into the body matching application 317. Optionally, any of such images may be uploaded by way of a scanner or importable document (such as JPEG, PDF, BMP, or any other file type) into the matching application 317. One or more images may be uploaded or taken and, most preferably, multiple images are taken from different angles to allow for better accuracy in generating computer images depicting the features and characteristics of the customer.

While the Step 409 is shown as following Step 408 of receiving the customer's height, weight, clothing sires, and body shape and preceding Step 410 of receiving a medical diagnosis, if any, the uploading or taking of images of Step 409 may be undertaken at any point in time during operation of the body matching application 317. In addition, while one particular order of receiving particular customer information is disclosed, the order of receipt of customer information may be varied without departing from the scope of the present invention.

Once any images, if applicable, and other customer information are loaded into the body matching application 317 at Step 409, the body matching application 317 may be configured to display or otherwise provide a medical diagnosis to the customer at Step 410. For example, the application 317 may provide information to the customer that they may have back problems, knee problems, issues with the curvature of their spine, bone loss, etc., in which case, the application 317 may direct the customer to see a chiropractic or other medical professional. In such case, the application 317 may provide referrals to the customer and/or may allow the customer to input a zip code, address, or other location information such that the application 317 may find one or more medical professionals for the customer.

Following Step 410, the body matching application 317 may ask the user whether they would like real-time chiropractic advice at Step 430, If the customer does desire chiropractic advice, the application 317 proceeds to Step 432, wherein the application 317 initiates contact via telephone, instant message, Skype, or other real-time communication with a chiropractic healthcare professional. Once chiropractic advice is provided to the customer, the application 317 stores the chiropractic advice in the databases 114, 116, 316 at Step 434 in a record associated with that customer and the application 317 proceeds to Step 412. Alternatively, if the customer does not desire real-time chiropractic advice, the application 317 proceeds to Step 412. While chiropractic advice is shown and described as being offered and provided between Steps 410 and 412, chiropractic advice may alternatively be offered at the end of the application 317 or any time during the application 317 at which the application 317 may have determined that the customer should speak with a chiropractic healthcare professional. Still optionally, computer-generated chiropractic advice may be provided at Step 432. In particular, the application 317 may compare the medical diagnosis of a particular customer, upon receiving the requisite authorization by customers to use non-identifiable information, with the information of previous customers contained in the databases 114, 116, 316 to find a customer with a similar medical diagnosis and issues. The application 317 may then provide the same or similar chiropractic advice as found in the database to the current customer.

Figure 5F:
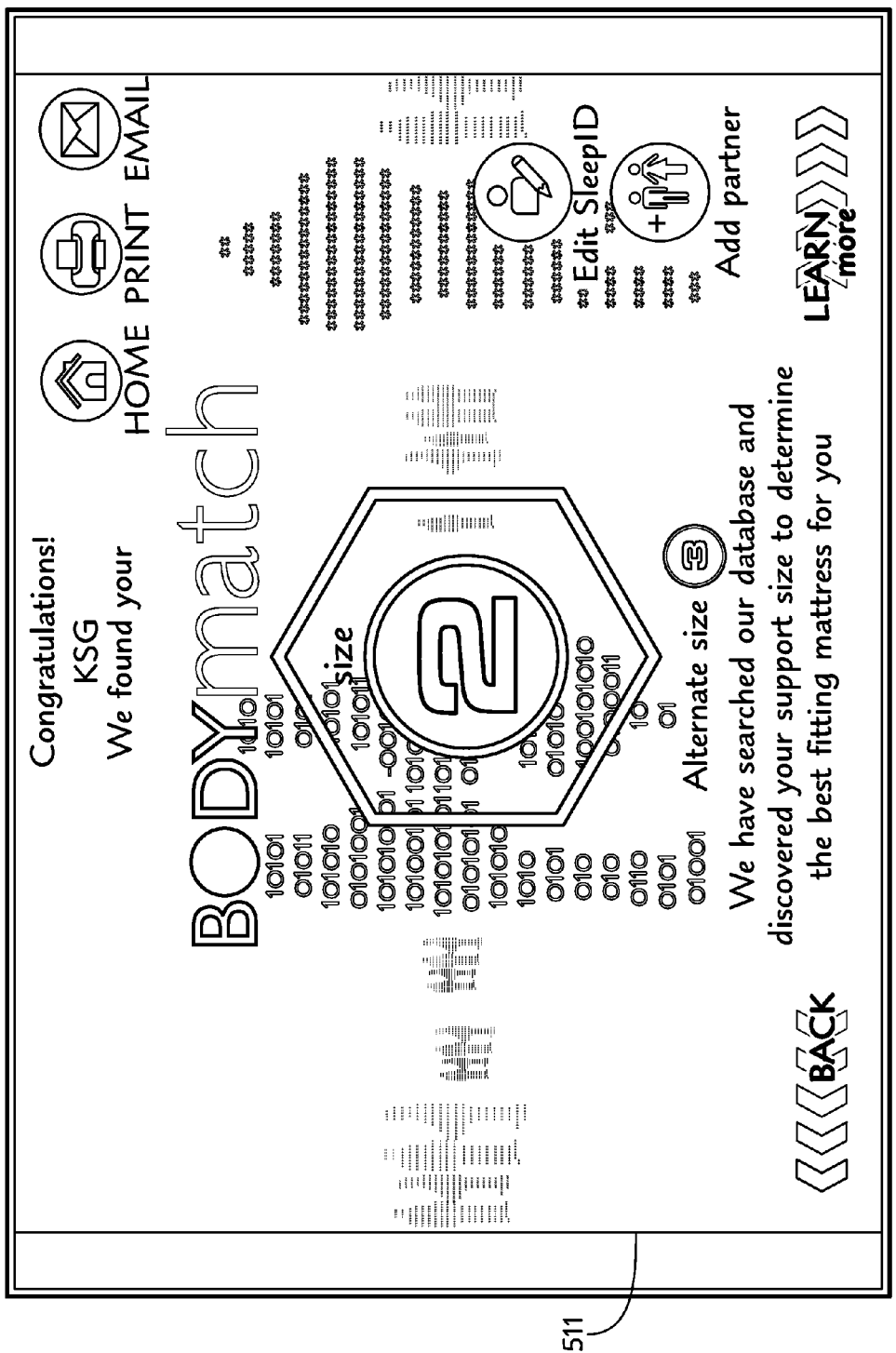
Figure 5H:
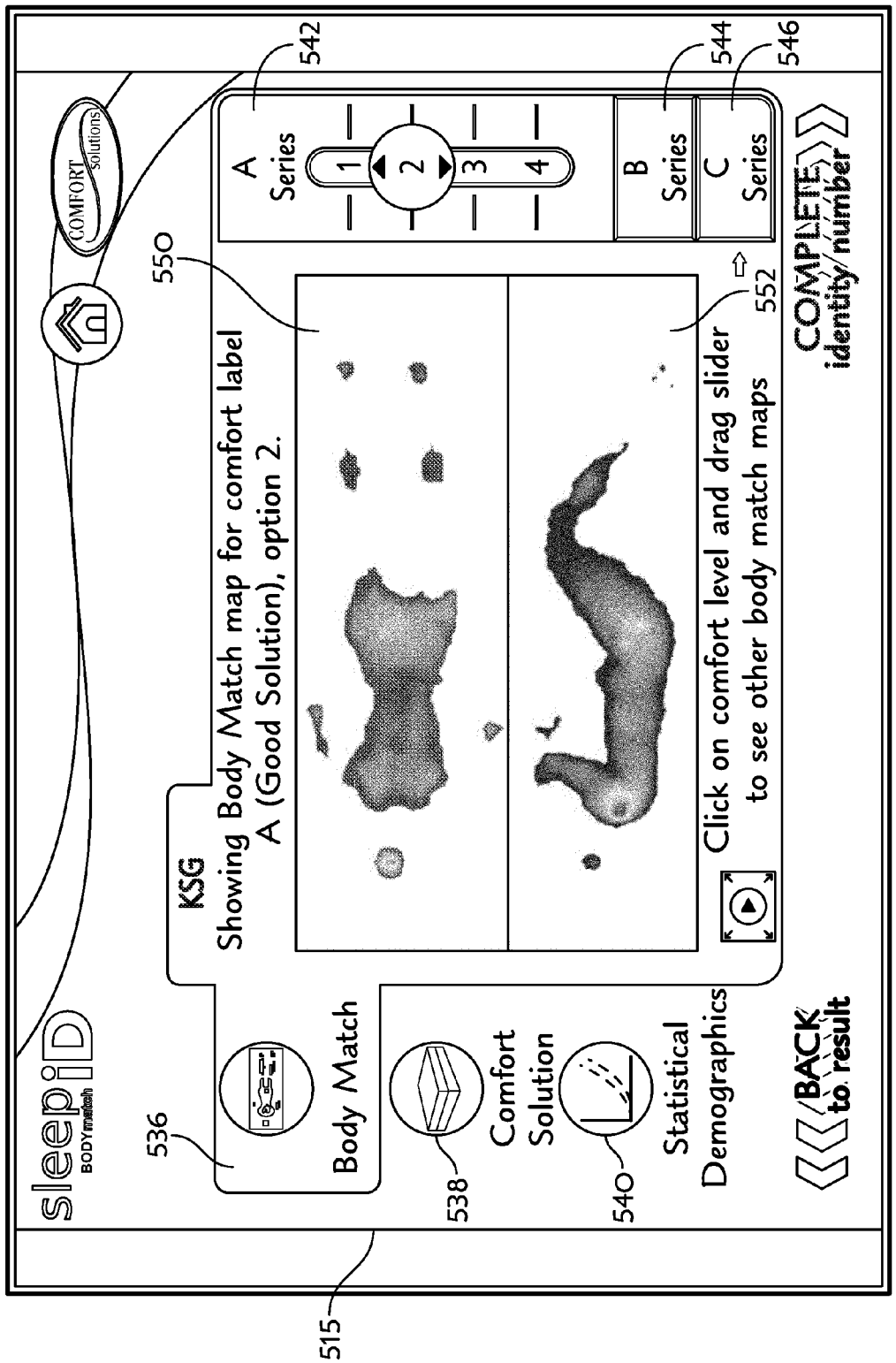
Figure 5I:
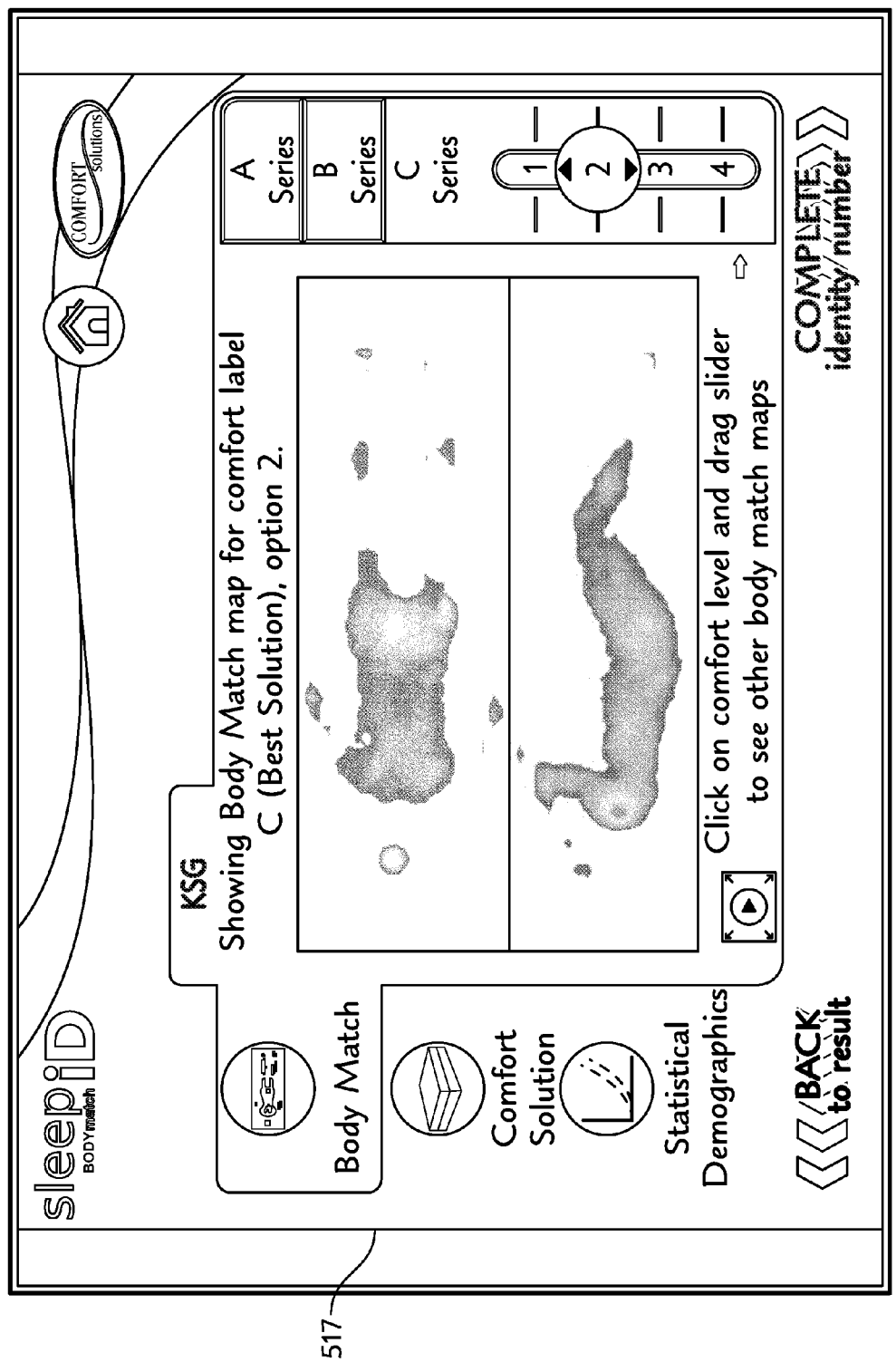
Figure 5K:
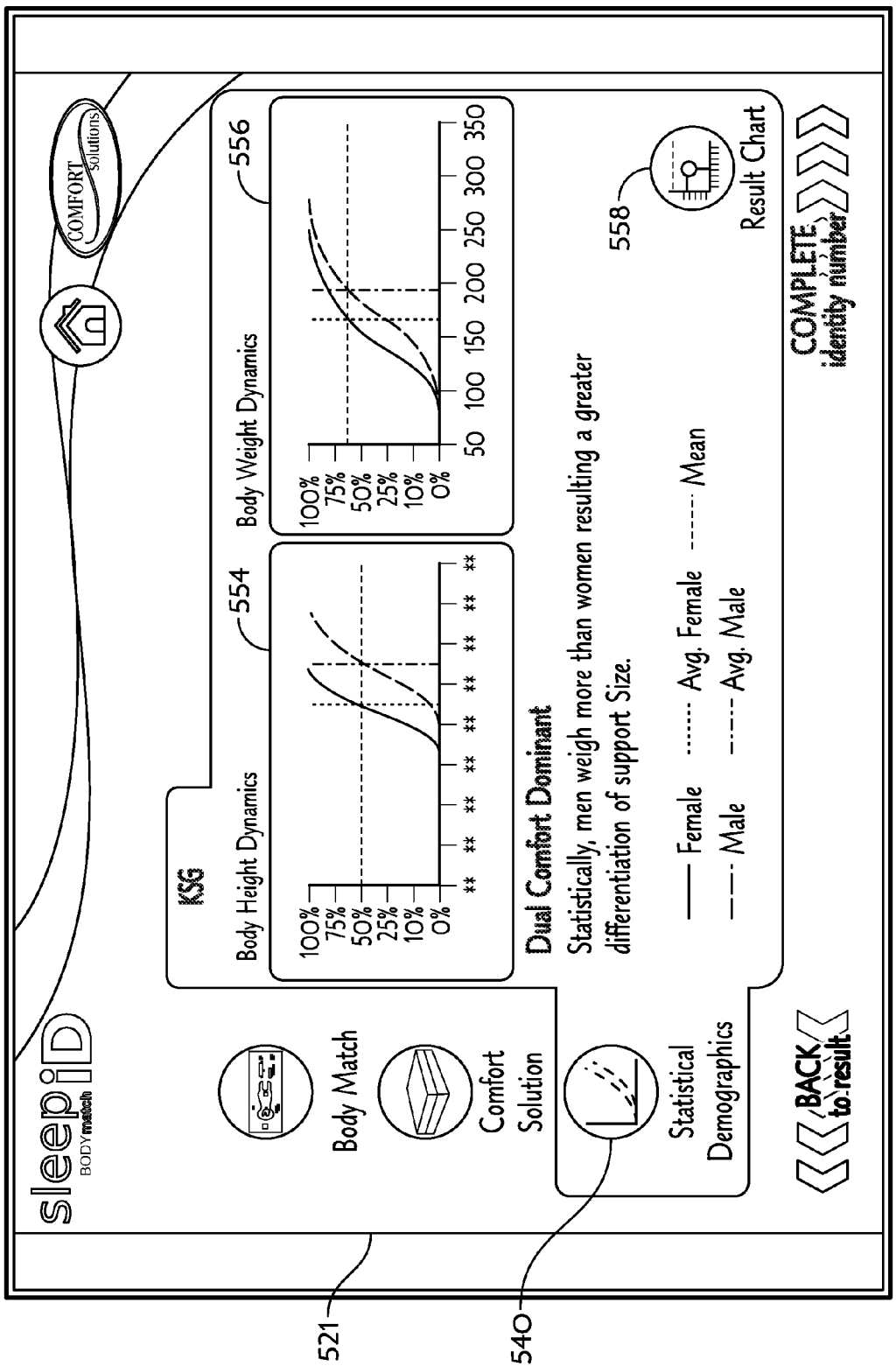
Figure 5L:
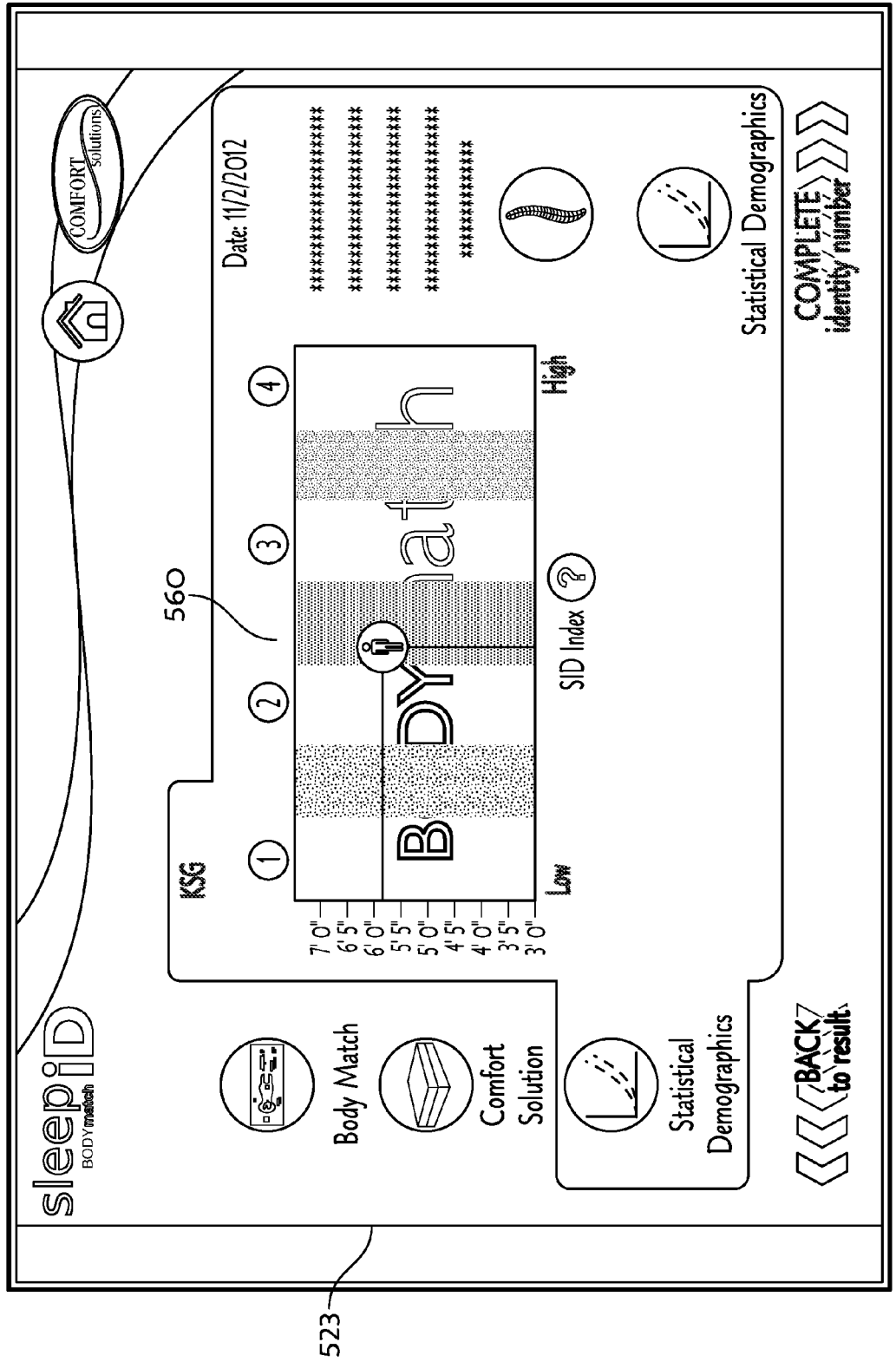
Figure 5M:
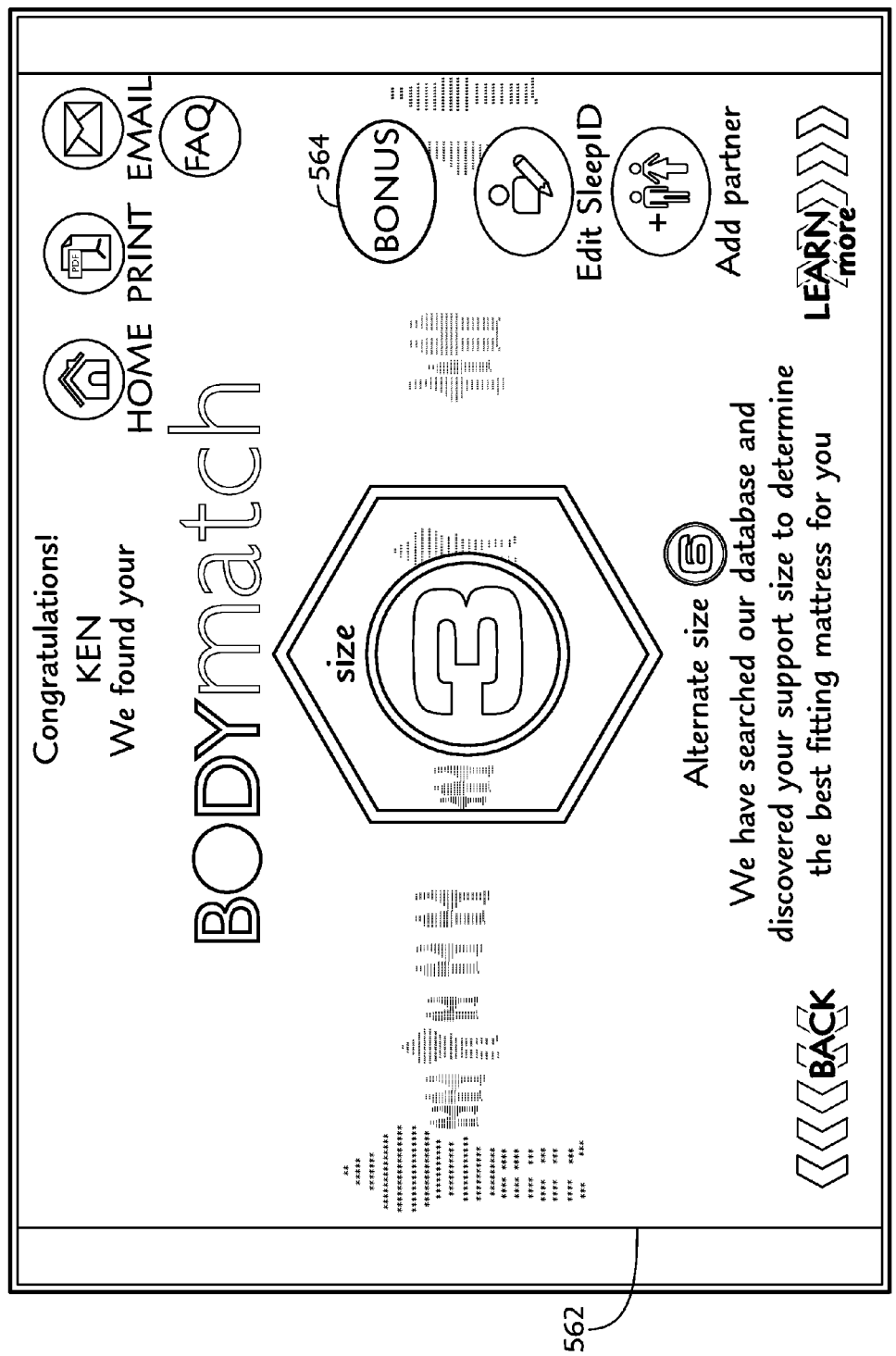
Figure 50:
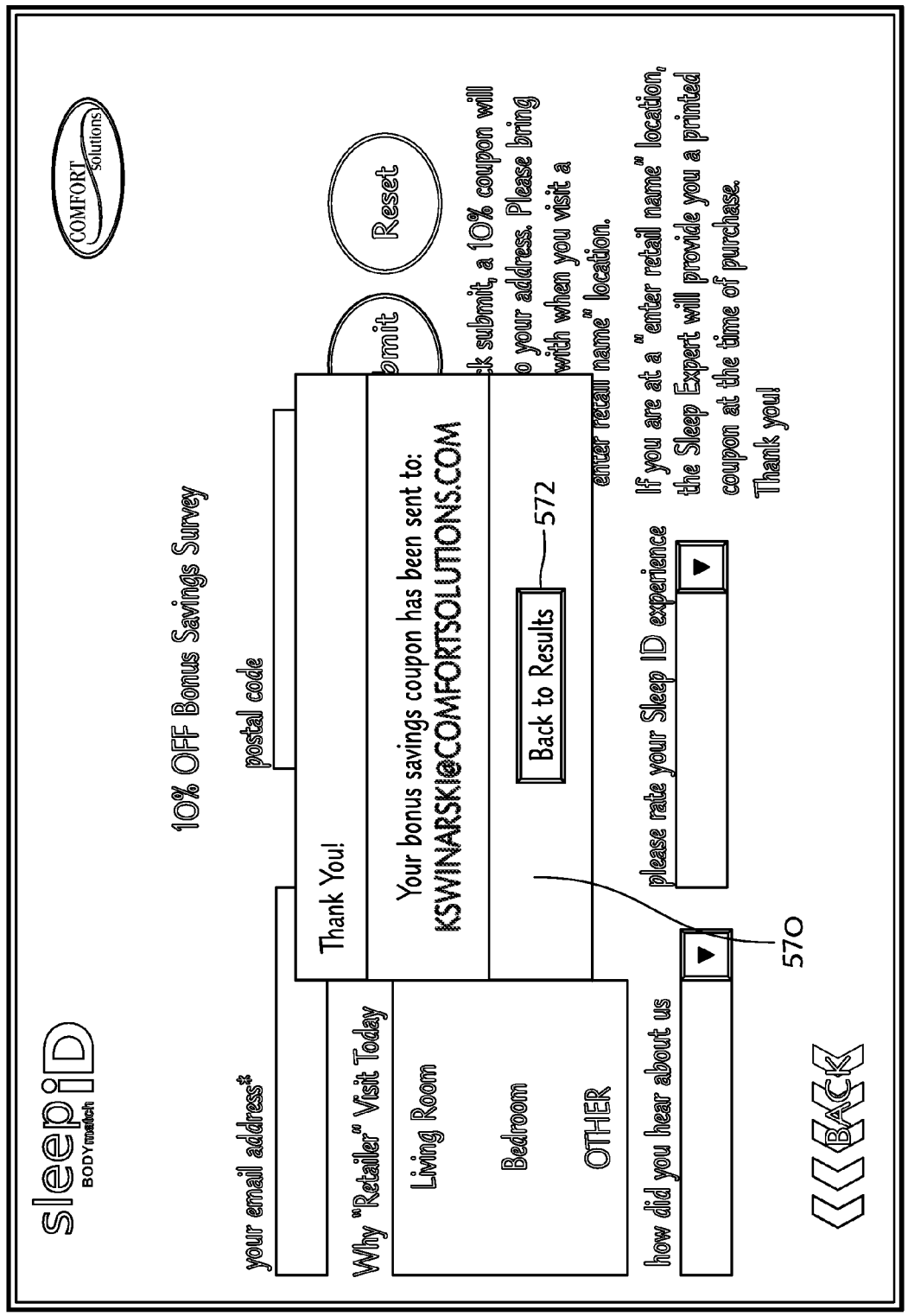
Figure 6A:
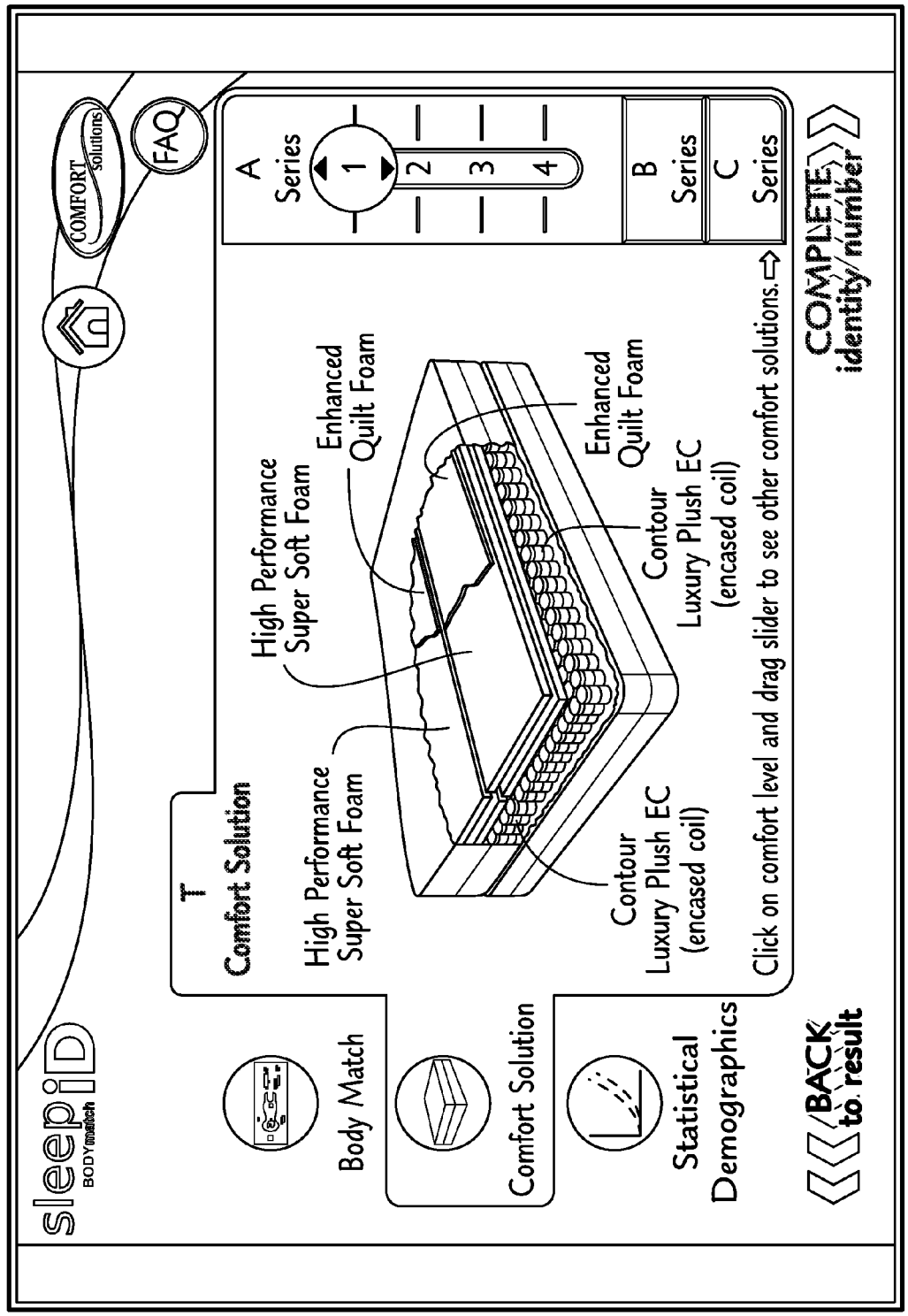
FIGS. 6A-6L illustrate partial exposed views of a plurality of mattresses, which embody a plurality of different mattress designs.
Figure 6B:
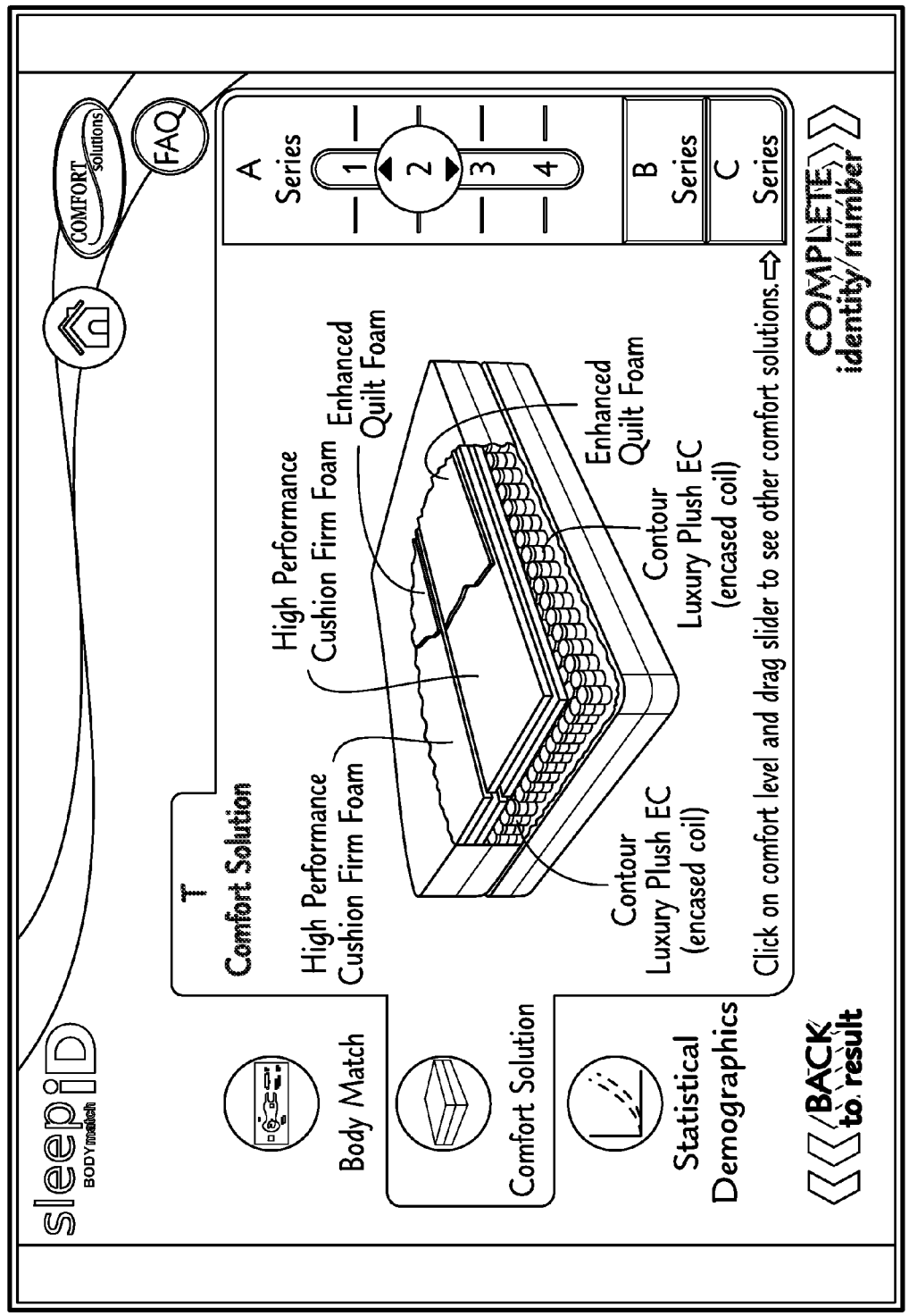
Figure 6C:
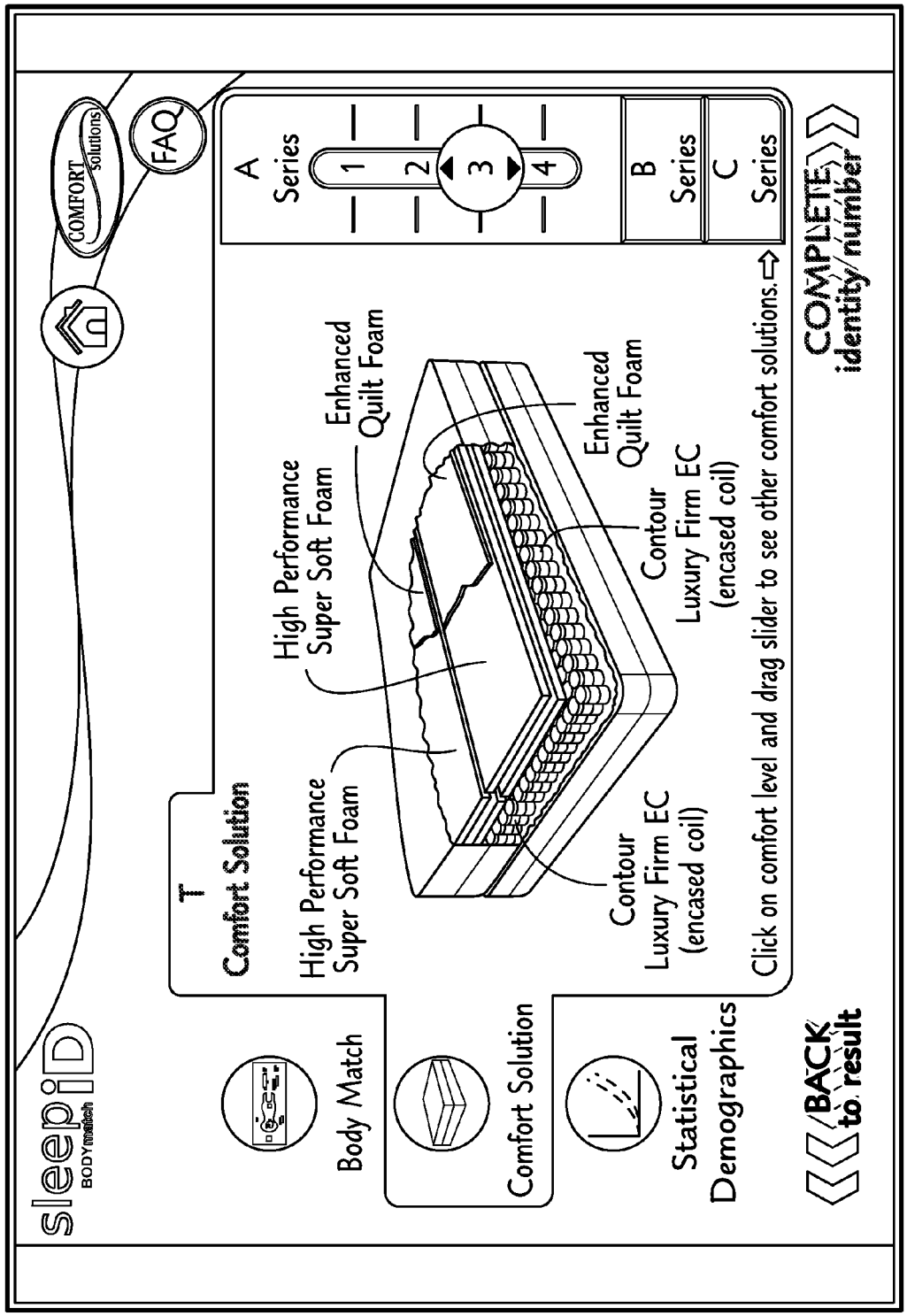
Figure 6D:
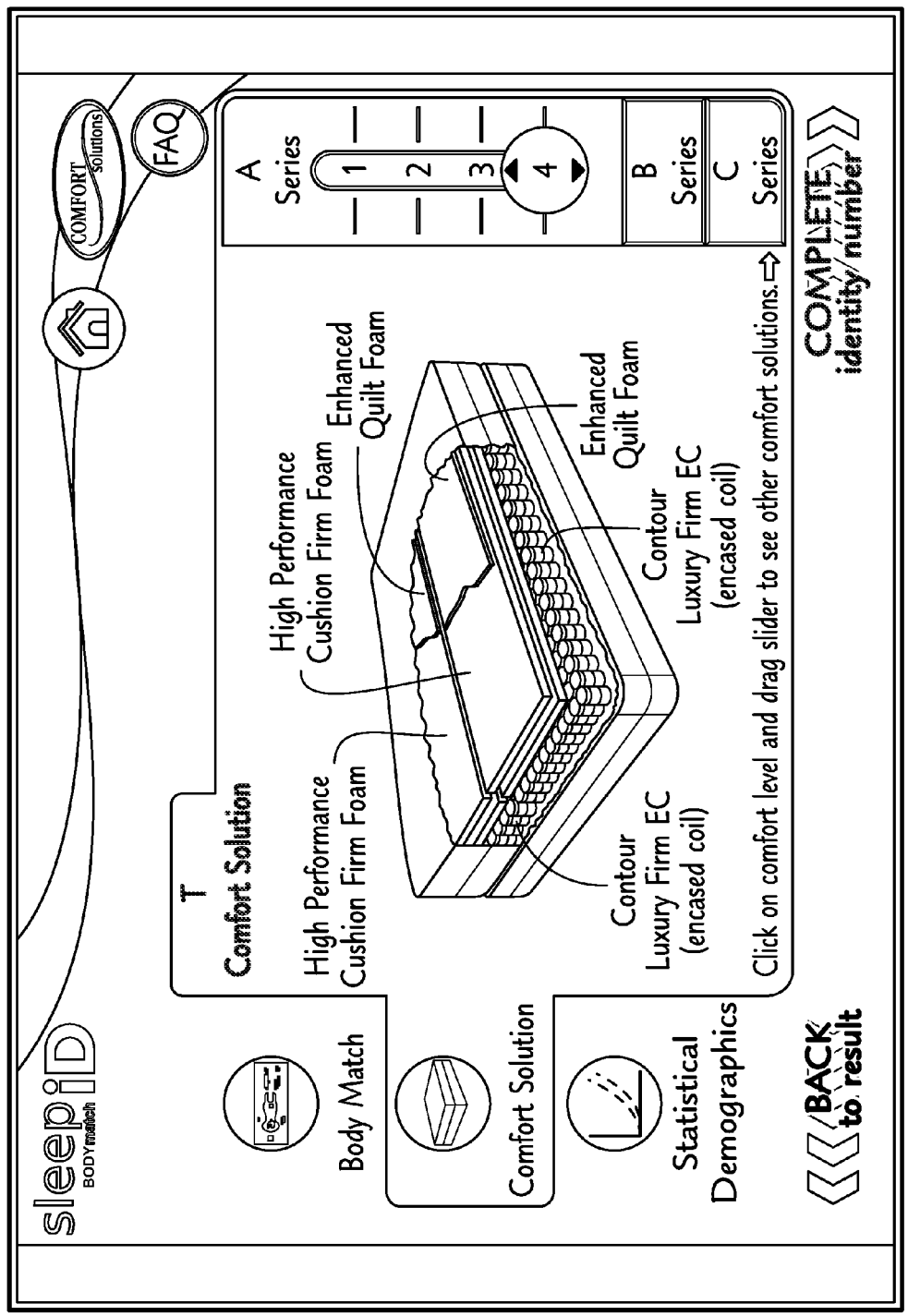
Figure 6E:
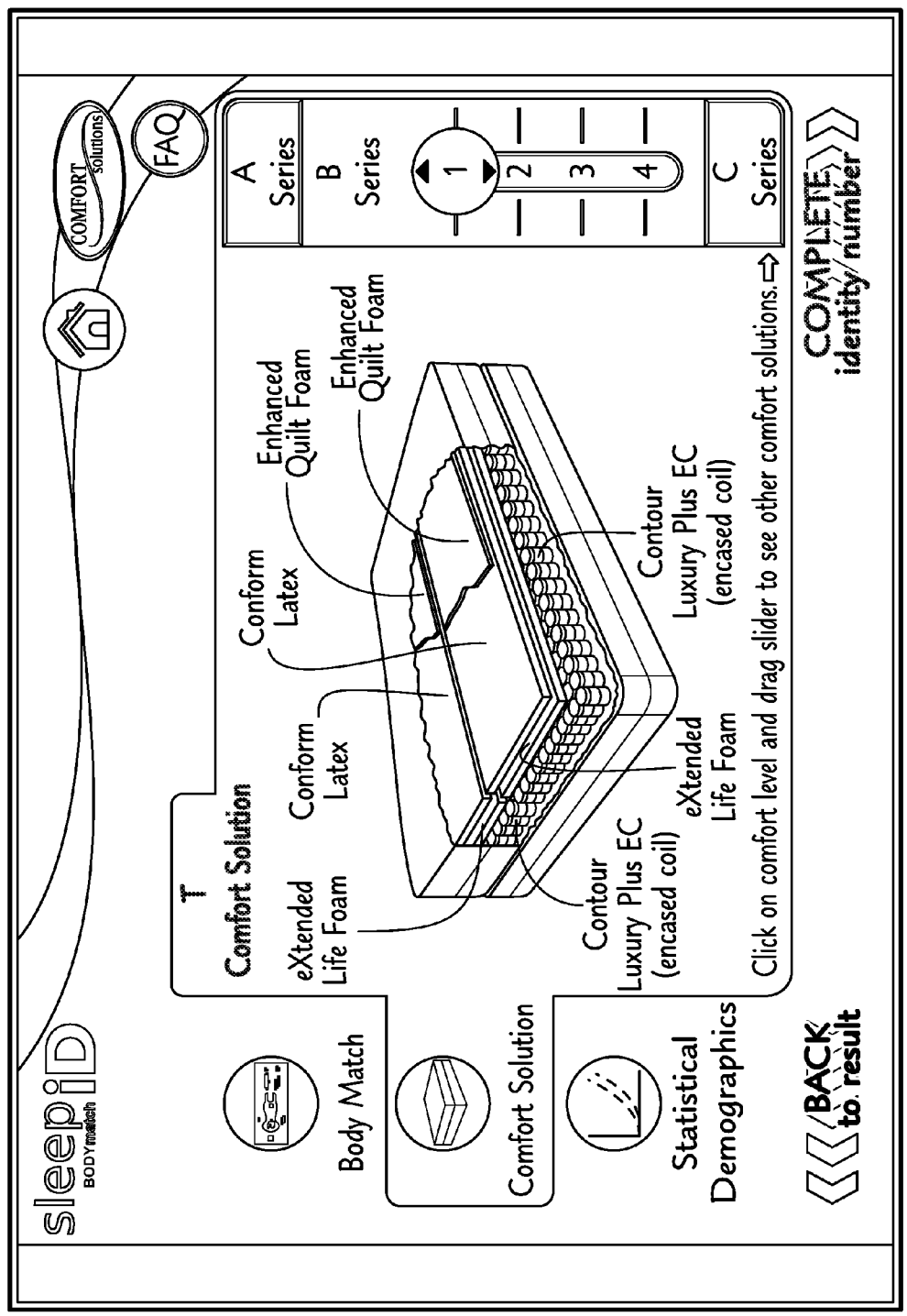
Figure 6F:
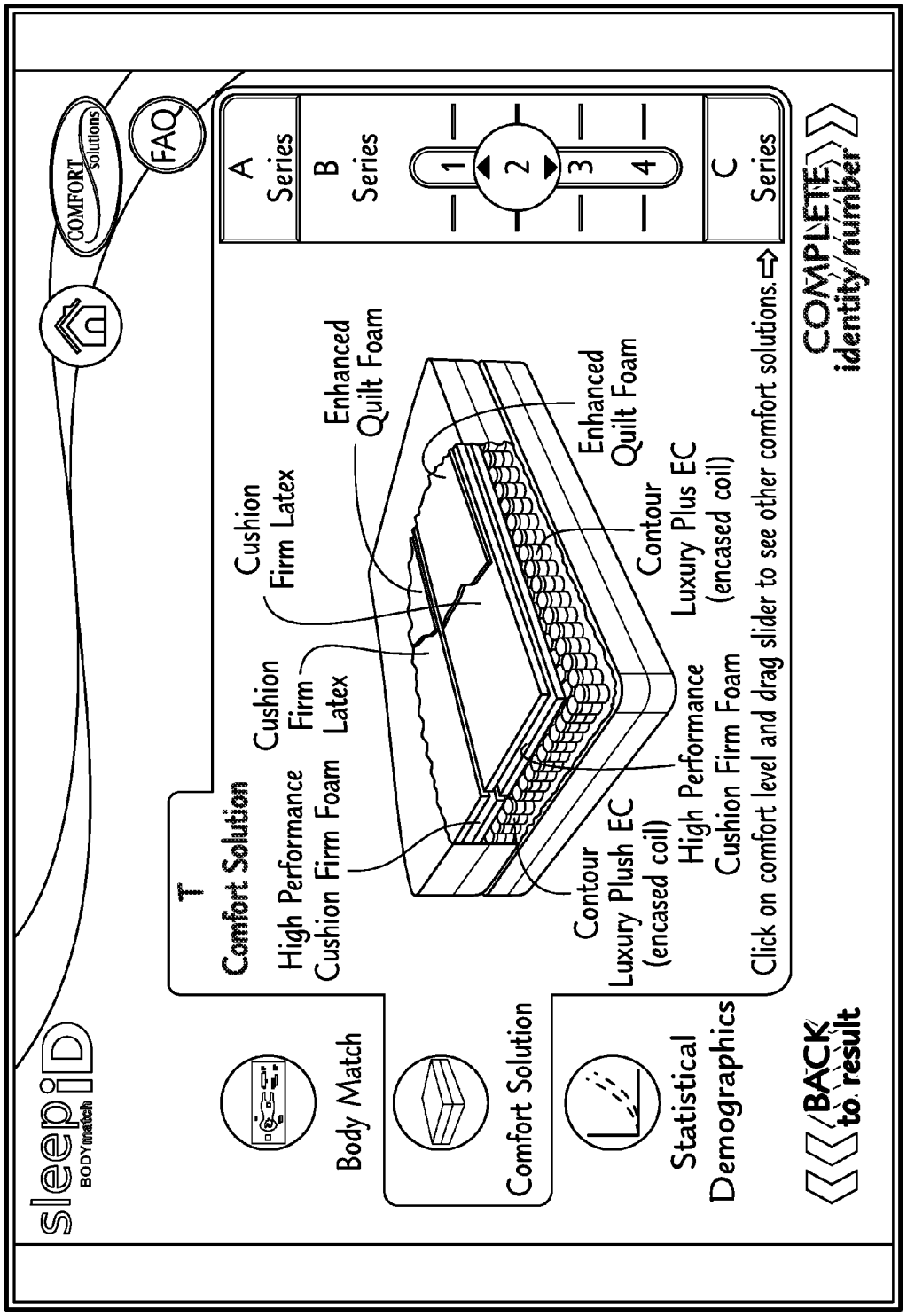
Figure 6G:
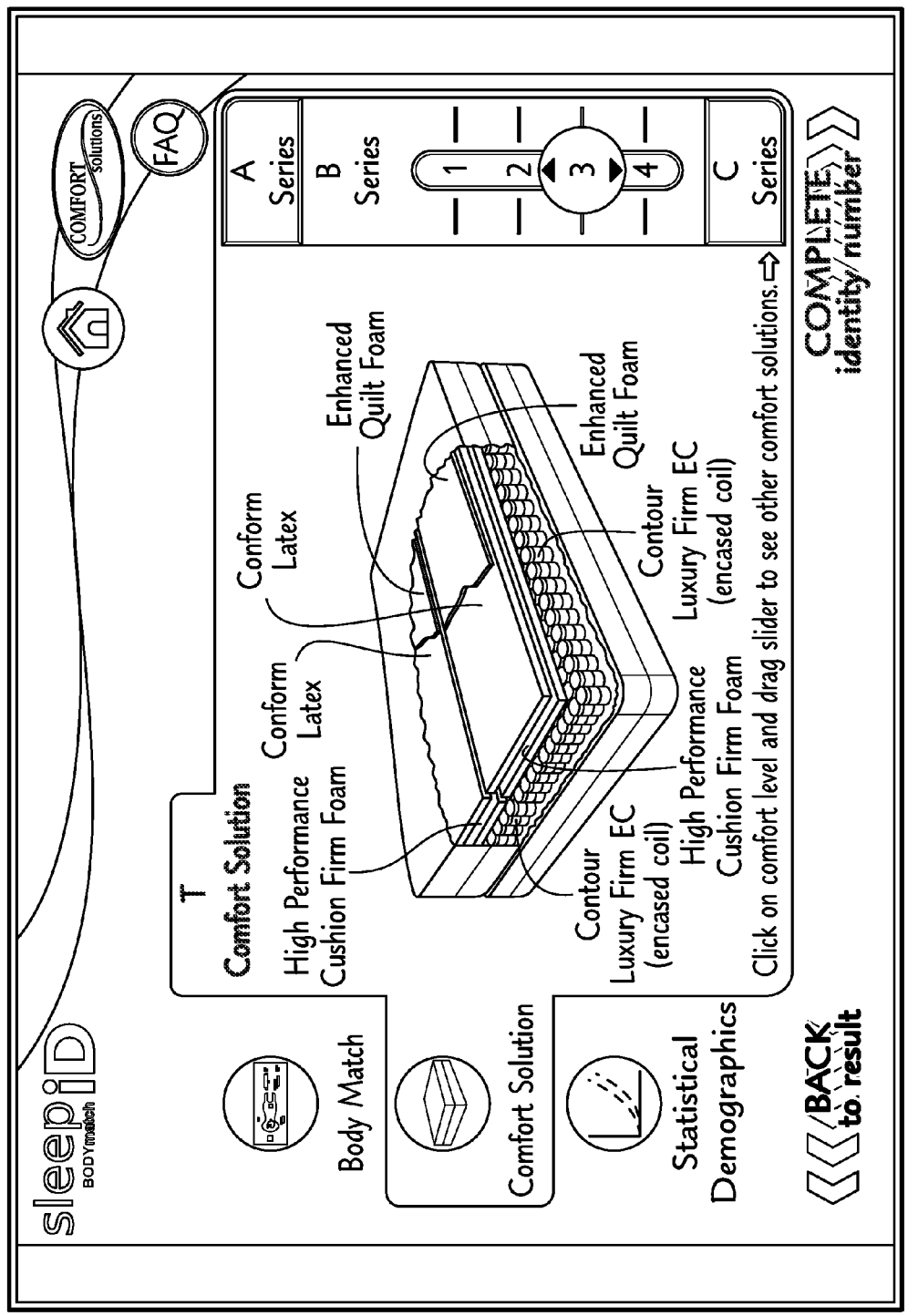
Figure 6H:
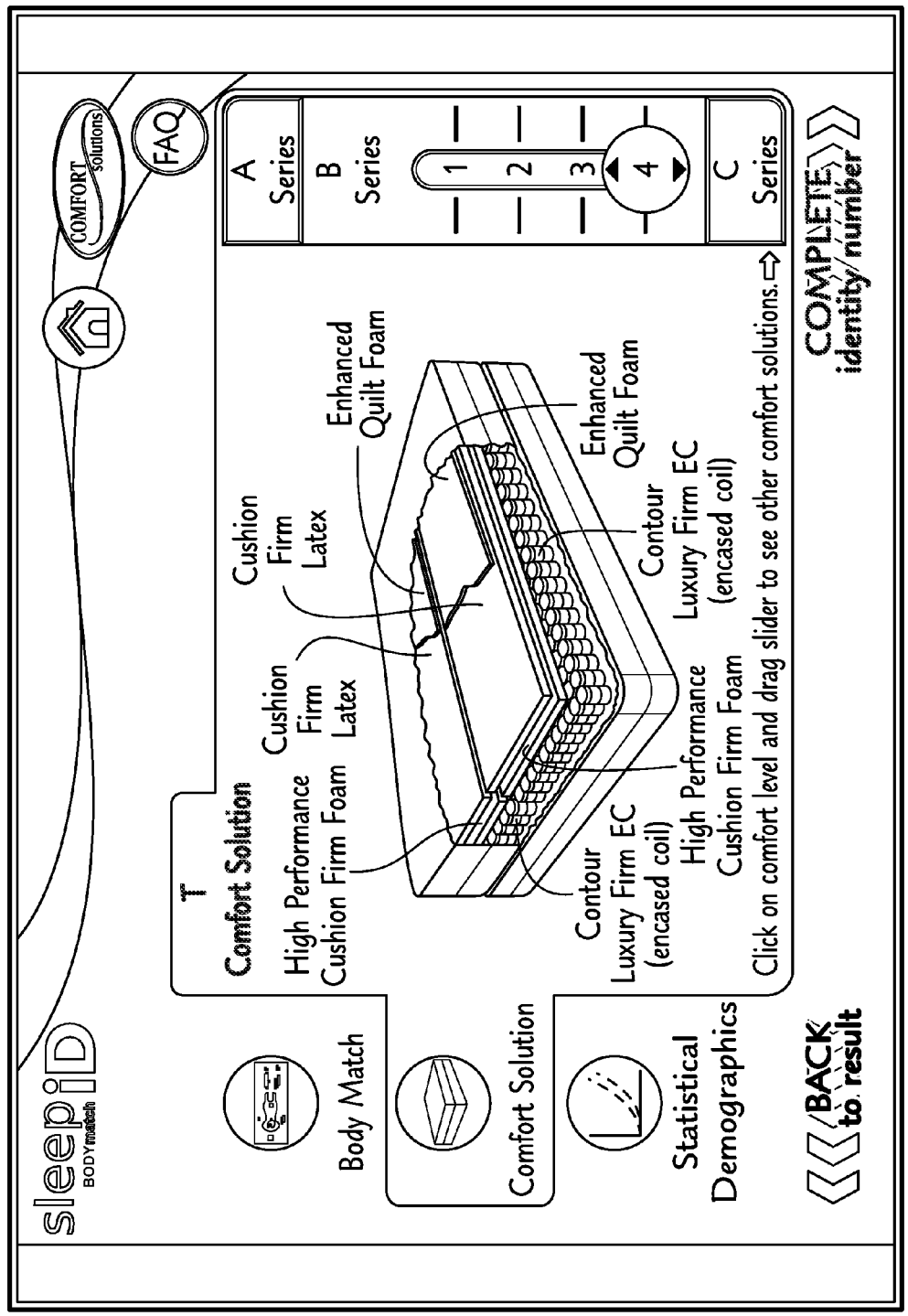
Figure 6I:
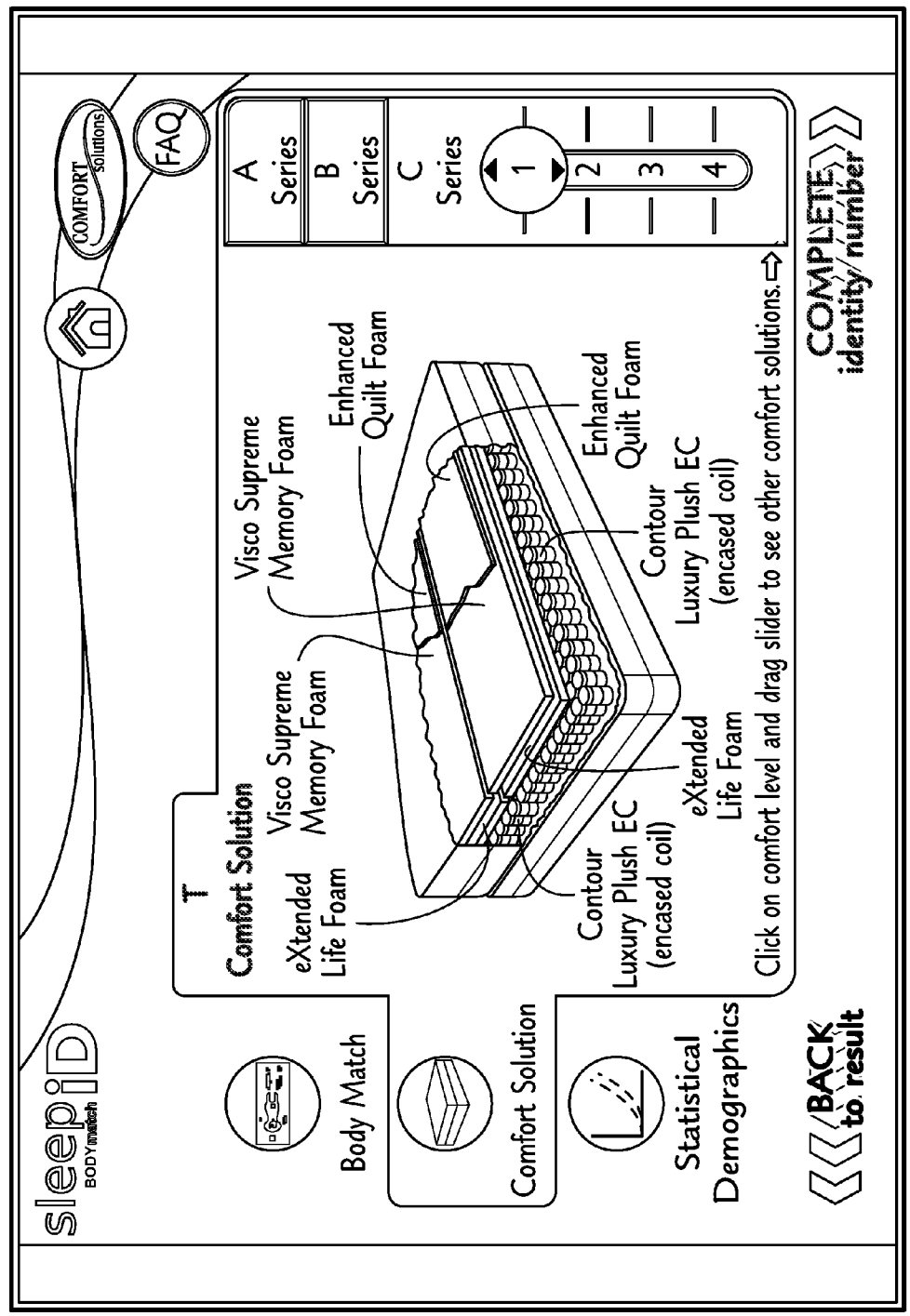
Figure 6J:
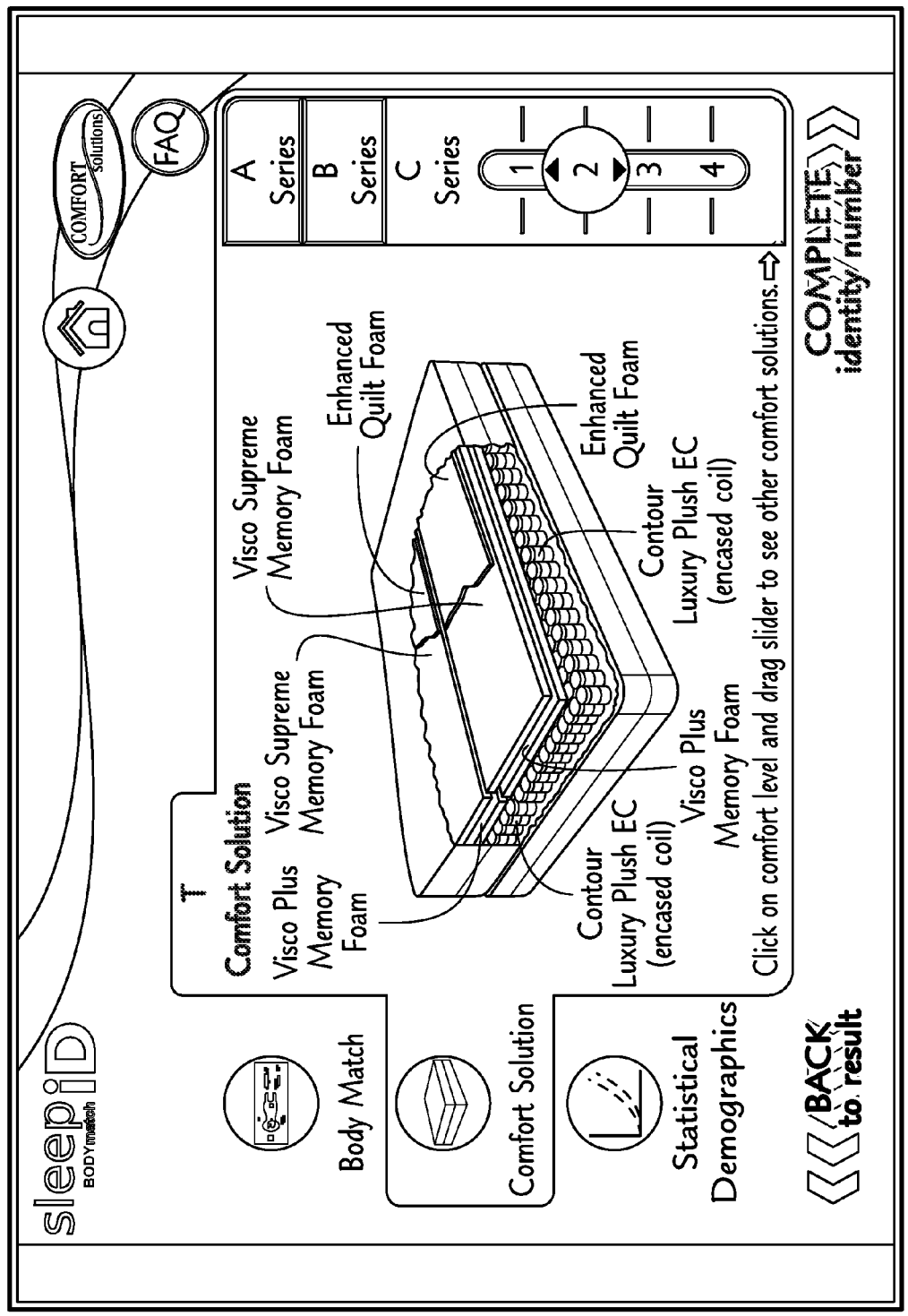
Figure 6K:
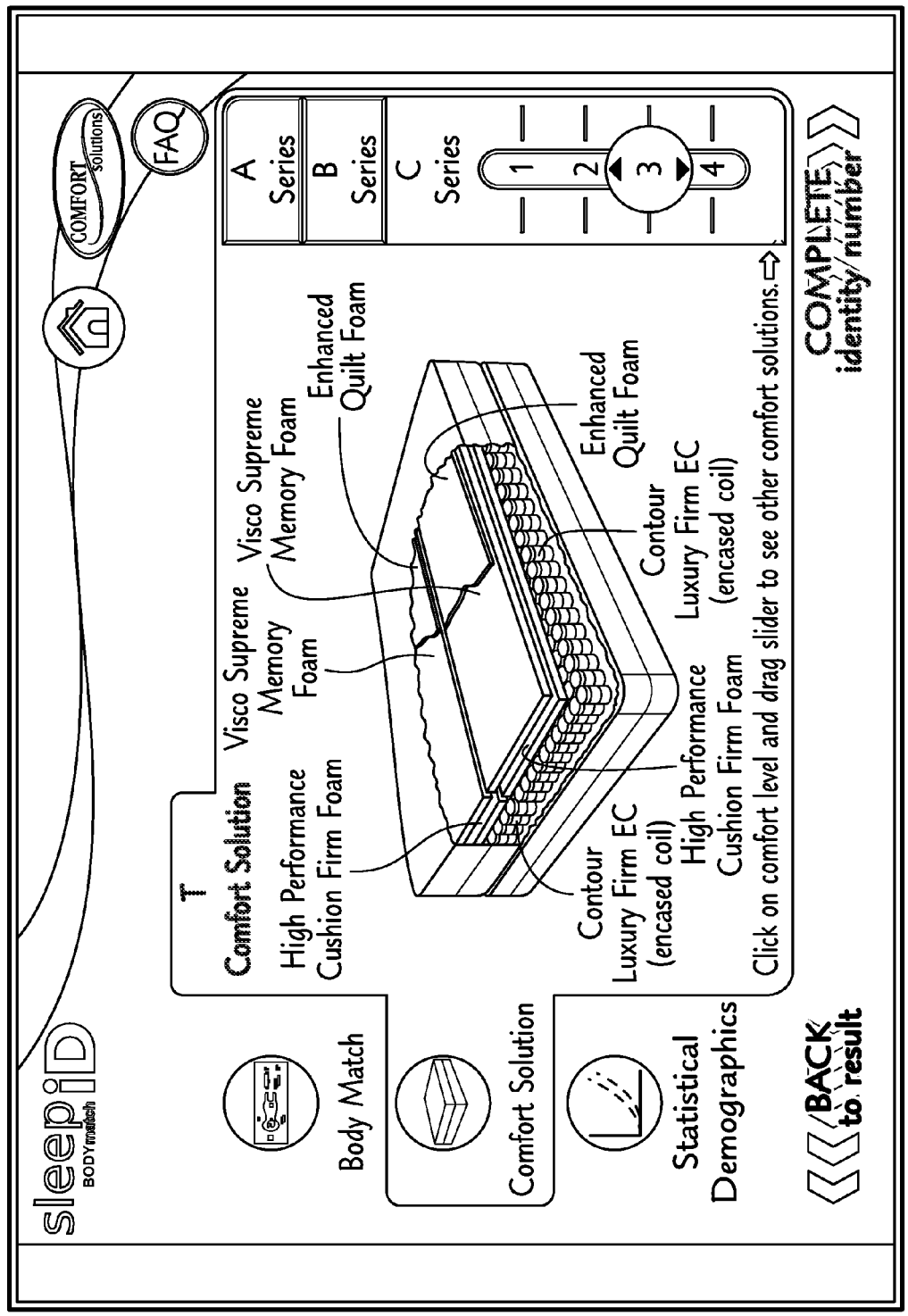
Figure 6L:
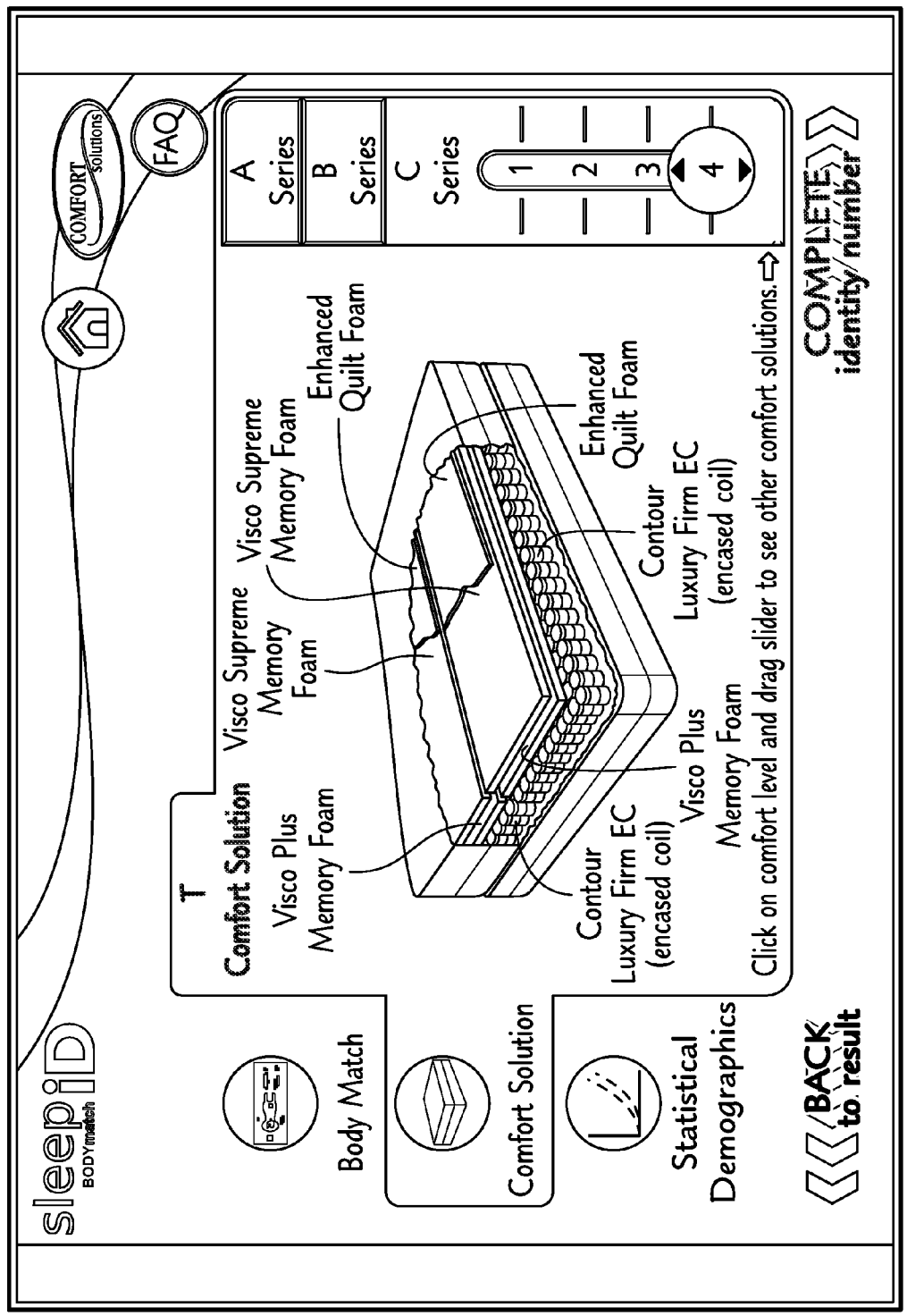

At Step 412, the body matching application 317 is configured to match or cross-reference the customer's entries or data against similar population body types stored in the associated database, thereby resulting in the generation of the identity number 574, also referred to as "SleepID" or support size, as displayed in interface screen 511 of FIG. 5F, at Step 412. An alternative interface screen 562 at Step 412 is shown in FIG. 5M. The difference between the interface screen 511 of FIG. 5F and the interface screen 562 of FIG. 5M is the addition of the Bonus button 564 in the interface screen 562 of FIG. 5M. If the Bonus button is selected on the interface screen 562, interface screen 566 of FIG. 5N is displayed and the customer is allowed to enter various items of information. Once the Submit button 568 is selected, a pop-up box 570 appears over the interface screen 566, as seen in FIG. 5O, indicating that a coupon has been sent to the customer's email address. Once a Back to Results button 572 is selected, the interface screen 562 of FIG. 5M again appears.

In addition to the overall clothing size, the body matching application 317 may also request from the customer the clothing sizes separately for his/her upper body and lower body, which helps to determine how the customer's weight is distributed along the length of his/her body, i.e., to determine his/her body shape. The provision or determination of the customer's body shape helps identify where the customer tends to carry extra weight, thereby determining more precisely the potential location of pressure points on mattresses.

As stated above, the body matching application 317 captures information related to the customer's physical characteristics and sleeping positions, as well as comfort concerns, and based on this information and comparison to the associated database 316 of the system determines support needs. In addition, the system may inquire about whether the customer has pain issues or comfort concerns. Based on this additional information, the process may be configured to suggest that the customer seek an evaluation by a chiropractic doctor or by any other suitable medical doctor, whose evaluation results may be inputted into the system 100 to derive a different identity number 574 or support size that provides a more suitable comfort solution. As noted above with respect to Steps 432 and 434, the chiropractic doctor may diagnose issues associated with the customer's spine, neck, hips, lower limbs, and/or any other part of the customer's body, and provide a diagnosis indicating which parts of the customer's body may require tailored support. The diagnosis information 325 may be stored in the databases 114, 116, and 316, and may be implemented into the process for recommending a bedding mattress that matches the support needs of a particular customer, at Step 410. The body matching application 317 then correlates the shopper's provided data, i.e., sleep data 120, shopper data 122, and diagnosis data 125, to population body type information 327 stored in the database 316 and closely matches the shopper's data to one of support sizes 1 to 4, thereby determining the customer's identity number 574, at Step 412. As stated above, an alternate support size may also be provided, for consideration in the mattress selection, which may be a lower support size or an upper support size, depending on how close the shopper's data is to the median point situated between the assigned support size and the alternate support size, and whether the customer is a side sleeper, a back sleeper or a stomach sleeper. As shown in FIG. 5F, the interface screen 511 also includes an "Edit SleepID" icon 532 and an "Add Partner" icon 534.

The "Edit SleepID" icon 532 serves to enable the shopper to repeat the process of determining his/her support size if he/she desires to modify any one of the answers provided in response to the questions generated by the body matching application 317. The "Add Partner" icon 534 serves to enable the customer or his/her partner, if present, to enter the other partner's own body characteristics, sleeping preferences, and comfort concerns to receive his/her separate identity number 574. Thus, upon detecting the selection of the "Add Partner" icon 534, at Step 414, the body matching application 317 generates substantially the same interface screens discussed above for the first shopper, to request data related to the partner's physical characteristics and sleeping preferences. At Step 416, the body matching application receives data entered for the partner. In particular, Steps 404, 406, 408, 409, and optionally Steps 410, 430, 432, and 434 may be repeated for the partner. The partner's entered data is then matched to similar body types stored in the associated database 316 and the body matching application 317 determines the partner's support size, at Step 418, as well as his/her alternate support size and generates another interface screen 513, in FIG. 5G, to display both the customer and partner support sizes and their respective alternate support sizes, at Step 418. The interface screen 513 includes a "Learn" icon 536, which if selected by the customer, may cause the body matching application 317 to generate another interface screen 515 that presents:

(i) information related to potential pressure points for sleepers with similar body types to the shopper and his/her partner via the "Body Match" icon 536, (ii) information about the proposed mattresses or support solution via the "Comfort Solution" icon 538, and (iii) information about where the customer and the partner are situated demographically with respect to the full spectrum of bodies, as discussed above and used in the body type comparisons, via the "Statistical Demographics" icon 540, at Step 420.

For this interface screen 515, the body matching application 317 also generates for display mattress series A, B and C, via icons 542, 544 and 546, respectively, which represent three categories of mattresses. Each of these categories of mattresses offers a different support solution for each of the support sizes 1 through 4. The distinguishable features for each of the mattress series A, B and C will be discussed in details hereafter. As such, by selecting the tab 548, associated with the customer, the "Body Match" icon 536, and one of the mattress series icons 542, 544 or 546, the body match application 317 generates another interface screen 515, in FIG. 5H, to display body pressure maps 550 and 552, which show how the selected mattress series, constructed specifically for the support size associated with the customer, supports the consumer. Body pressure maps 550 and 552 are used as exemplary tools to illustrate the locations of pressure points associated with the customer's body interaction with the mattresses, and any other suitable tools for illustrating pressure points may also be utilized. These body pressure maps 550 and 552 are generated in response to answers by customers and correlation to existing data. The body pressure maps 550 and 552 are not generated by requiring customers to lay on a pressure sensor pad. Alternately, one of the other two mattress series icons may be selected to trigger the body match application 317 to generate and display another set of pressure maps to illustrate how the corresponding mattress supports the customer. As displayed by interface screen 515, each of the mattress series can also be matched with any one of the four support sizes to generate corresponding pressure maps. The body match application 317 is configured to identify which one of the mattress series A, B or C provides a good support solution, a better support solution, or the best support solution. By selecting the "Comfort Solution" icon 538, the body matching application 317 may retrieve from the database 316 and display on interface screen 519 a partially exposed view of the mattress that was matched to the support size of the customer. Further, by selecting the "Statistical Demographics" icon 540, the body matching application 317 may generate another interface screen 521 to display a "Body Height Dynamics" graph 554 and a "Body Weight Dynamics" graph 556, which illustrates where the customer and the partner fit demographically in height and weight with respect to their corresponding gender population. Moreover, the interface screen 517 may also include a "Result Chart" icon 558. Upon selection of the "Result Chart" icon, the body matching application 317 generates another interface screen 523 to display another graph 560 that illustrates graphically how close the customer and the partner are demographically situated vis-à-vis their respective support sizes and their alternate sizes. For example, as illustrated, the customer was assigned support size 2 with alternate size 3, because demographically the data, provided by the customer, places the customer closer to support size 2 on the interval separating support size 2 from support size 3.

As stated above, each of the mattress series A, B and C may be constructed specifically for each of the predetermined support sizes 1-4, thereby providing twelve (12) potentially different mattress constructions to provide the best possible suitable sleep solutions for each potential customer, although the number of different mattress constructions may be increased or decreased without departing from the spirit of this invention. As shown in FIGS. 6A-6L, the collection of mattresses, shown on interface screen 515, features premium, foam-encased coil units that allow for firmness choices on either side of a bed, different upholstery layers, including high-density, soy-based poly foams, latex, visco or visco-latex combinations, to customize the whole bed or just one side of the bed.

Referring again to the flowchart of FIG. 4, the body matching application 317, after determining and displaying a body-match number at Step 420, may store any received or developed customer information in the databases 114, 116, 316 at Step 440. Alternatively, the application 317 may store customer information at any point in time during the application 317 or may store customer information at multiple points in time during the application 317, for example, any time information is received or developed. After customer information is stored in the databases 114, 116, 316, at Step 442, any or all of the customer information may be forwarded to the customer via text message, email, home, work, or other address, or any other communication medium, if the customer so desires. The application 317 may include a prompt that allows the customer to request their information (e.g., a summary of their inputs, any recommendations, any diagnoses, etc.) or a portion of their information and input a telephone number, email address, address, or other communication medium. Optionally, forwarding of the customer information may occur automatically after a bodymatch number is determined and displayed and all appropriate customer information is saved in the databases 114, 116, 316.

As described in detail above, the body matching application 317 may request information from a customer, for example, a dominant sleep position, for example during the stages of deepest sleep, as seen in FIG. 5D. Optionally, or additionally, the body matching application 317 may request, either in the screen of FIG. 5D or in any other screen, qualitative information regarding the sleep habits or patterns of a customer and/or the customer's sleeping partner. The qualitative information may be used to generate a number that is representative of the best support level for a particular individual. For example, the body matching application 317 may include a question about a preferred sleep temperature, wherein the screen may include, for example, buttons corresponding to hot, warm, cool, and/or cold to indicate the general temperature at which the customer likes to sleep. Optionally, a customer may be allowed to enter an exact temperature at which the customer likes to sleep (i.e., using keystrokes, using up and down arrow keys, or by any other suitable means). Similarly, the body matching application 317 may include a question about how the customer's body temperature is affected by sleep, wherein the screen may include, for example, buttons corresponding to hot, warm, cool, and/or cold to indicate the customer's body temperature during sleep. The body matching application may also include a question about how temperature affects the customer's sleep.

The body matching application 317 may include a question regarding the general sleep quality of the customer, wherein the customer may select from bad, challenging, fair, good, and/or excellent. Still optionally, the body matching application 317 may include a question about the number of hours the customer sleeps, wherein the customer may be able to select from answers such as 1-3 hours, 4-5 hours, 6-7 hours, and/or 8 or more hours. Similarly, the body matching application 317 may include a question regarding how the customer feels about the amount of sleep he/she gets. The customer may be presented with selectable answers such as too little, okay, and/or just right. The body matching application 317 may include a question about how long it takes for the customer to fall asleep, wherein exemplary answers may include 0-5 minutes, 6-10 minutes, 11-20 minutes, and/or 20 or more minutes.

The body matching application 317 may alternatively or additionally ask questions about waking routines. For example, the body matching application 317 may include a question about how the customer feels when they wake and may present answers such as not refreshed, refreshed, and/or very refreshed. Similarly, the body matching application 317 may include a question about the number of times the customer snoozes, for example, 0 times, 1 time, 2 times, and/or 3 or more times.

Other questions that could be included in the body matching application 317 include questions about the frequency and/or length of naps taken by the customer (with answers such as daily long, daily short, weekly one or more hours, etc.), the frequency of exercise (with answers such as 0 times per week, 1-2 times per week, 3-4 times per week, daily, etc.), the size of the customer's current mattress (with answers such as twin, full, queen, and king), and the current firmness and/or preferred firmness of mattress (with answers such as extra firm, firm, medium, and soft).

The body matching application 317 may also include questions regarding sleep disturbances. For example, the application 317 may present a question about whether the customer experiences any environmental disturbances (e.g., light, television, noise, etc.), motion disturbances (e.g., children, partner, pets, etc.), breathing disturbances (e.g., allergy, snoring, etc.), or any other sleep disturbances. The customer may be allowed to input an answer for each of a number of different types of sleep disturbances or for each individual sleep disturbance. Exemplary answers presented by the application 317 may include severe, mild, none, or any other suitable answers.

Pain and/or discomfort may also be addressed by the body matching application 317. For example, the body matching application 317 may include questions about acid reflex, back pain, joint (hip and/or shoulder) pain, and/or any other pain or discomfort a customer may experience. Exemplary answers presented by the application 317 may include severe, mild, none, or any other suitable answers.

The body matching application 317 may include any number of the questions and/or user selections described herein. While the questions are presented as having specific selectable answers, the body matching application 317 may optionally include one or more blanks to allow a customer to input one or more answers. Further, while examples of answers are disclosed, any suitable selectable answers may be presented to the customer.

Figure 7:
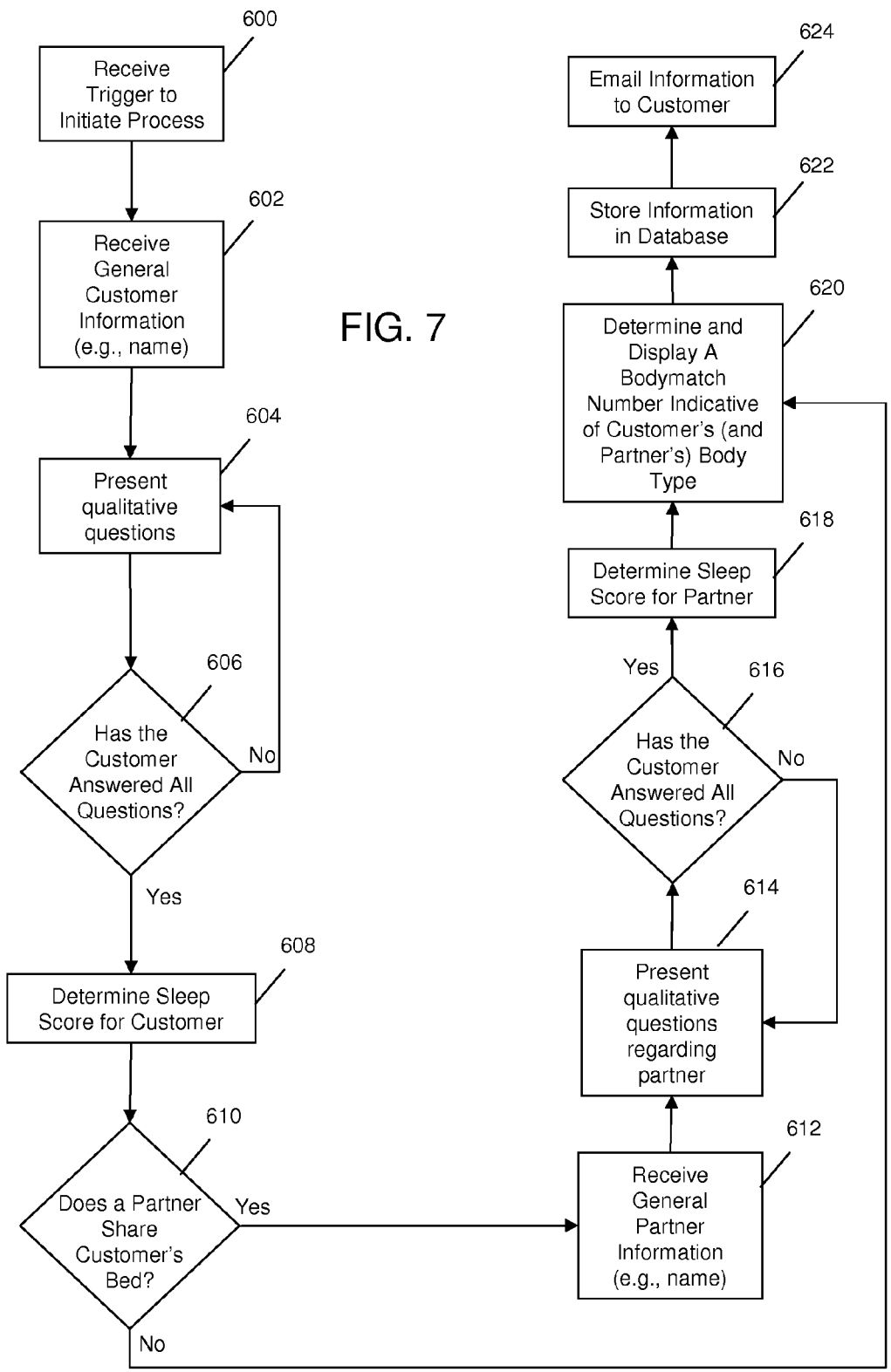
FIG. 7 is a flow chart illustrating a further embodiment of a process for selecting a bedding mattress in accordance with the invention.

A flow chart illustrating a further embodiment of a process for selecting a bedding mattress is depicted in FIG. 7. While specific screens may not be discussed in relation to FIG. 7, it should be understood that any of the screens disclosed herein and/or any other screens may be presented to a customer. The body matching application 317 may be configured to generate and display an opening customer body matching interface screen, such as the screen 501 shown in FIG. 5A, at Step 600. The opening customer body matching interface screen allows the customer to begin the process of providing personal data, such as body type, height, weight, body shape or size, and dominant sleep position, in order to generate a support level or identity number and which assist a user in matching their bedding comfort and support needs to one of a plurality of the available mattresses.

Similar to Step 404 described in relation to FIG. 5B, upon detection by the body matching application 317 that the customer wants to begin the application, the body matching application 317 may generate and transmit or display another interface screen at Step 602, for example the screen 503 of FIG. 5B, which may include a virtual keyboard 504 for entering the customer name (and other general customer information). Once the customer enters his/her name by selecting corresponding letters via a cursor on the virtual keyboard 504, the customer is presented at Step 604 with any number of the qualitative questions discussed in detail above at Step 604. After the customer answers each question, the body matching application 317 checks at Step 606 whether the customer has answered all relevant questions. If not, the body matching application 317 returns to Step 604 to present additional questions and repeats Steps 604 and 606 until all relevant questions have been answered.

Numerical values are assigned to each of the individual answers for the relevant questions and the body matching application 317 is configured to, at Step 608, calculate a sleep score for the customer utilizing the numerical values within an equation. Additionally or alternatively, the body matching application 317 may match or cross-reference the data entered for the customer, the numerical values assigned to that customer's individual answers, and/or the results of entering the numerical values into the equation, against similar population body types stored in the associated database. Regardless of the method used, a sleep score for the customer is determined and one or more suggestions for a bed may be based on the sleep score.

The body matching application 317 may include a screen with an icon, such as the "Add Partner" icon 534 of FIG. 5F, or ask the customer whether they would like to add a partner at Step 610. If the customer wishes to add a partner, the body matching application 317 may present, at Steps 612, 614, and 616 similar interface screens to those presented in Steps 602, 604, and 606, respectively, to request general information regarding the partner and to present qualitative questions regarding the partner's sleep habits and patterns, as discussed in detail above. The same or different qualitative questions may be presented regarding the customer and the partner.

At Step 618, the body matching application 317 receives data entered for the partner and is configured to assign numerical values to the partner's individual answers and calculated a sleep score for the partner utilizing the numerical values within the equation. Additionally or alternatively, the body matching application 317 may match or cross-reference the data entered for the partner, the numerical values assigned to that partner's individual answers, and/or the results of entering the numerical values into the equation, against similar population body types stored in the associated database. Regardless of the method used, a sleep score for the partner is determined and one or more suggestions for a bed may be based on the sleep score.

Once the customer's and/or partner's sleep scores are determined, the body matching application 317 proceeds (from either Step 610, if no partner was selected, or from Step 618, if a partner was selected) to Step 620, wherein body-match numbers are determined and displayed for the customer and/or partner. The body matching application 317 determines an appropriate bed for the customer and the partner based on the sleep scores of the customer and the partner. In illustrative embodiments, the appropriate bed may be determined by blending one or more of the numerical values assigned to the customer's and the partner's answers, blending the customer's and the partner's sleep scores, and/or blending the results of entering the numerical values assigned to the customer's and the partner's answers into the equation. Still further, any of this data may be blended together to determine the appropriate bed for the customer and the partner. If no partner exists, the body matching application 317 determines an appropriate bed for the customer based on the customer's sleep score. The data entered and determined for the customer and/or the partner is stored in a database at Step 622 and the data is optionally emailed to the customer at Step 624.

The process of FIG. 7 factors in various parameters of sleep for a customer (and potentially a partner). In one illustrative embodiment, the process factors in actual sleeping posture positions, pain elements, consumer preference estimations, and an alignment of a skeletal frame, to determine which bed best suits the customer. The process applies a logic sequence to dial in the appropriate range of comfort for a customer.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

We claim:
1. A method for selecting one of a plurality of different bedding mattresses for a customer, the method comprising:
   receiving a set of data related to a body temperature of the customer during sleep; and
   processing by a processor the set of data to evaluate support needs for a customer, and
   determining by the processor which of the plurality of bedding mattresses has support characteristics that closely match the support needs of the customer.

2. The method of claim 1, further including the steps of receiving a second set of data related to body characteristics and sleep preferences of the customer; and
   processing by the processor the first and second sets of data to evaluate support needs for a customer;
   wherein the second set of data includes body characteristics including gender, age, height, weight, weight distribution, body shape, and top and bottom clothing sizes.

3. The method of claim 2, further including the steps of:
   receiving a third set of data related to a dominant sleep position of the customer;
   processing by the processor the first, second, and third sets of data to evaluate support needs for a customer;
   wherein the third set of data includes a selection from the group consisting of sleeping on the stomach, sleeping on the back, and sleeping on the side.

4. The method of claim 1, further including the step of receiving data related to a partner of the customer.

5. The method of claim 4, further including the step of processing the data related to the partner to evaluate the support needs for the partner.

6. The method of claim 3, further including the step of electronically forwarding information related to the first set of data, the second set of data, the third set of data, the evaluation of the support needs for the customers, or the support needs of the customer to the customer.

7. The method of claim 1, wherein the determining step includes the step of cross-referencing data from a set of data against similar population body types stored in a database.

8. The method of claim 3, wherein the determining step includes the step of cross-referencing data from the first set of data, the second set of data, or the third set of data against similar population body types stored in a database.

9. The method of claim 1, further including the step of providing a first option bedding mattress and an alternative option bedding mattress.

10. The method of claim 1, further including the step of providing a range of acceptable bedding mattresses.

11. A method for selecting one of a plurality of different bedding mattresses for a customer, the method comprising:
   receiving a first set of data related to body characteristics of the customer;
   receiving a second set of data related to a temperature of the customer during sleep; and
   processing by a processor the first and second sets of data to evaluate support needs of the customer and determine which of the plurality of bedding mattresses has support characteristics that closely match the support needs of the customer.

12. The method of claim 11, wherein the first set of data includes body characteristics including gender, age, height, weight, weight distribution, body shape, and top and bottom clothing sizes.

13. The method of claim 11, further including the step of receiving data related to a partner of the customer.

14. The method of claim 13, further including the step of processing the data related to the partner to evaluate the support needs for the partner.

15. A method for selecting one of a plurality of different bedding mattresses for a customer, the method comprising:
   receiving a first set of data related to available mattresses;
   receiving a second set of data related to sleep profile information stored in a database;

receiving a third set of data related to a temperature preference of the customer during sleep; and processing the first, second, and third sets of data to evaluate support needs of the customer, and determining with a processor which of the plurality of bedding mattresses has support characteristics that closely match the support needs of the customer.

16. The method of claim 15, wherein the first set of data includes the available mattresses and the amount of support provided by the mattresses.

17. The method of claim 16, wherein the second set of data includes body type profiles and information about mattress structures and mattress materials and their properties.

* * * * *